US011969683B2

(12) United States Patent
Lutade et al.

(10) Patent No.: US 11,969,683 B2
(45) Date of Patent: Apr. 30, 2024

(54) CHIMNEY FOR IMPACTOR NOZZLES AND INTEGRATED ASSEMBLY

(71) Applicant: CUMMINS FILTRATION IP, INC., Columbus, IN (US)

(72) Inventors: Ruchi Lutade, Pune (IN); Avinash Ayarekar, Pune (IN); Christopher E. Holm, Madison, WI (US); Benjamin L. Scheckel, Stoughton, WI (US); Sachin Ravasaheb Managave, Belgaum (IN); Vijay Dinkar Kolhe, Nashik (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 243 days.

(21) Appl. No.: 17/337,747

(22) Filed: Jun. 3, 2021

(65) Prior Publication Data
US 2021/0291100 A1 Sep. 23, 2021

Related U.S. Application Data

(63) Continuation of application No. PCT/US2029/048116, filed on Aug. 26, 2019.
(Continued)

(51) Int. Cl.
*B01D 45/08* (2006.01)
*B01D 45/16* (2006.01)
(Continued)

(52) U.S. Cl.
CPC ......... *B01D 46/0043* (2013.01); *B01D 45/08* (2013.01); *B01D 45/16* (2013.01);
(Continued)

(58) Field of Classification Search
CPC .... B01D 46/0043; B01D 45/08; B01D 45/16; B01D 45/18; B01D 46/10; B01D 50/20;
(Continued)

(56) References Cited

U.S. PATENT DOCUMENTS 4,627,406 A * 12/1986 Namiki ................. F01M 13/04
123/573
5,041,146 A * 8/1991 Simmerlein-Erlbacher ................
B01D 50/10
96/57
(Continued)

FOREIGN PATENT DOCUMENTS

CN 105649711 A 6/2016
CN 108442995 A 8/2018
(Continued)

OTHER PUBLICATIONS

International Search Report and Written Opinion issued for PCT Application No. PCT/US2019/048116, dated Dec. 27, 2019, 11 pages.
(Continued)

*Primary Examiner* — Dung H Bui
(74) *Attorney, Agent, or Firm* — Foley & Lardner LLP

(57) ABSTRACT

A separation assembly comprises a housing and a plate. The housing comprises an inlet and an outlet. The plate is positioned within the housing between the inlet and the outlet. The plate comprises a wall, at least one aperture, and at least one chimney comprising an inner surface surrounding the at least one aperture and an outer surface. The chimney extends from an upstream side of the wall and encompasses only a portion of a flow path between the inlet and the upstream side of the wall such that fluid can flow radially beyond the outer surface of the at least one chimney in the housing between the inlet and the wall.

18 Claims, 25 Drawing Sheets

Related U.S. Application Data

(60) Provisional application No. 62/776,074, filed on Dec. 6, 2018.

(51) Int. Cl.
    *B01D 45/18*     (2006.01)
    *B01D 46/00*     (2022.01)
    *B01D 46/10*     (2006.01)
    *B01D 50/20*     (2022.01)
    *F01M 13/04*     (2006.01)

(52) U.S. Cl.
    CPC ............. *B01D 45/18* (2013.01); *B01D 46/10* (2013.01); *B01D 50/20* (2022.01); *F01M 13/04* (2013.01); *F01M 2013/0433* (2013.01); *F01M 2013/0438* (2013.01)

(58) Field of Classification Search
    CPC ........... F01M 13/04; F01M 2013/0433; F01M 2013/0438
    See application file for complete search history.

(56) References Cited

U.S. PATENT DOCUMENTS

| | | | |
|---|---|---|---|
| 6,135,367 A * | 10/2000 | Hsu | B05B 7/0416 55/440 |
| 6,521,010 B1 * | 2/2003 | Katata | C23C 14/3464 204/192.12 |
| 7,238,216 B2 | 7/2007 | Malgorn et al. | |
| 7,473,291 B2 | 1/2009 | Evenstad et al. | |
| 7,614,390 B2 * | 11/2009 | Holzmann | F01M 13/04 123/572 |
| 7,648,543 B2 | 1/2010 | Faber et al. | |
| 7,699,029 B2 | 4/2010 | Herman et al. | |
| 8,152,884 B1 * | 4/2012 | Severance | B01D 45/08 73/863.22 |
| 8,202,339 B2 * | 6/2012 | Janakiraman | B01D 45/08 55/463 |
| 9,598,992 B2 * | 3/2017 | Ruppel | F01M 13/04 |
| 9,879,578 B2 * | 1/2018 | Herman | F01M 13/04 |
| 10,518,203 B2 * | 12/2019 | Bonne | B01D 45/08 |
| 10,710,015 B2 * | 7/2020 | Tada | B01D 45/08 |
| 2006/0080948 A1 | 4/2006 | Rodgers | |
| 2010/0024366 A1 | 2/2010 | Hodges et al. | |
| 2010/0107883 A1 * | 5/2010 | Faber | B01D 45/08 96/187 |
| 2010/0300297 A1 | 12/2010 | Ng et al. | |
| 2011/0179755 A1 * | 7/2011 | Gruhler | B29C 66/30321 55/320 |
| 2014/0033922 A1 | 2/2014 | Peck et al. | |
| 2014/0059985 A1 * | 3/2014 | Janakiraman | B01D 46/003 55/459.4 |
| 2014/0165512 A1 | 6/2014 | Horiuchi | |
| 2016/0177890 A1 * | 6/2016 | Kobayashi | F01M 13/04 55/327 |
| 2017/0145879 A1 * | 5/2017 | Ratajczack | F01M 13/04 |
| 2018/0015401 A1 | 1/2018 | Bonne et al. | |
| 2018/0104630 A1 | 4/2018 | Miyanaga et al. | |
| 2019/0168146 A1 * | 6/2019 | Garrett | B01D 50/20 |

FOREIGN PATENT DOCUMENTS

| | | |
|---|---|---|
| JP | 2011-256761 A | 12/2011 |
| JP | 2013-245597 A | 12/2013 |
| KR | 101822832 B1 | 1/2018 |

OTHER PUBLICATIONS

European Search Report issued for European Patent Application No. EP 19894281.5 dated Jul. 15, 2022, 15 pages.

Preliminary Rejection issued for South Korea Patent application No. 10-2021-7016681 dated Feb. 24, 2023.

\* cited by examiner

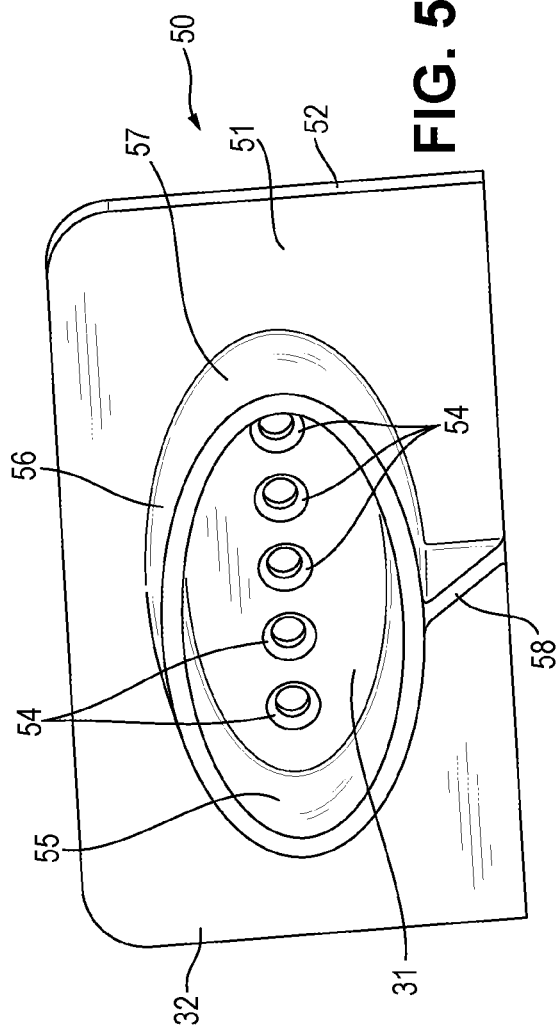
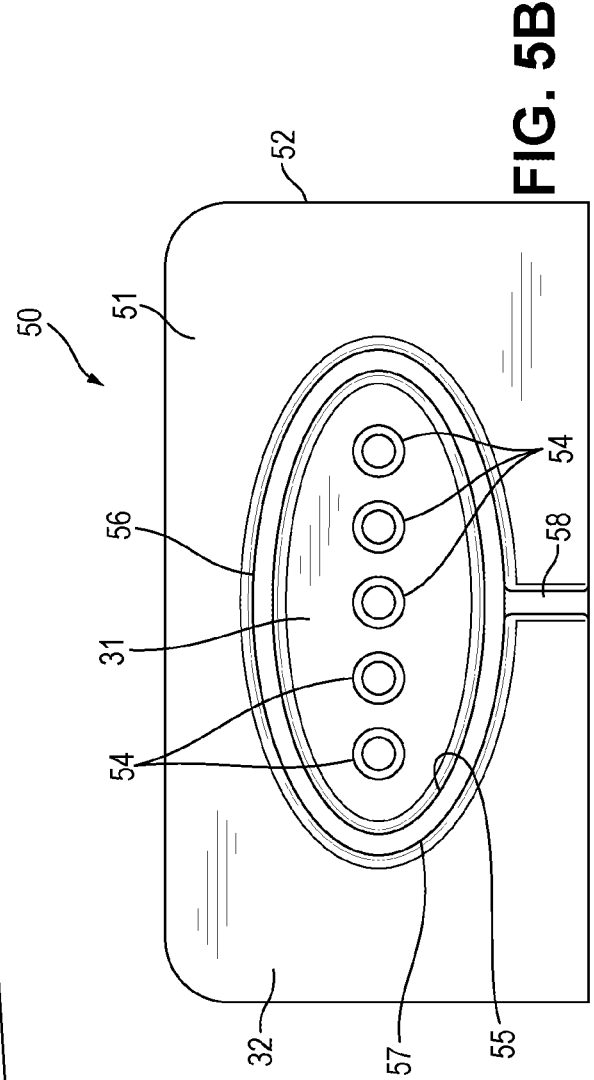

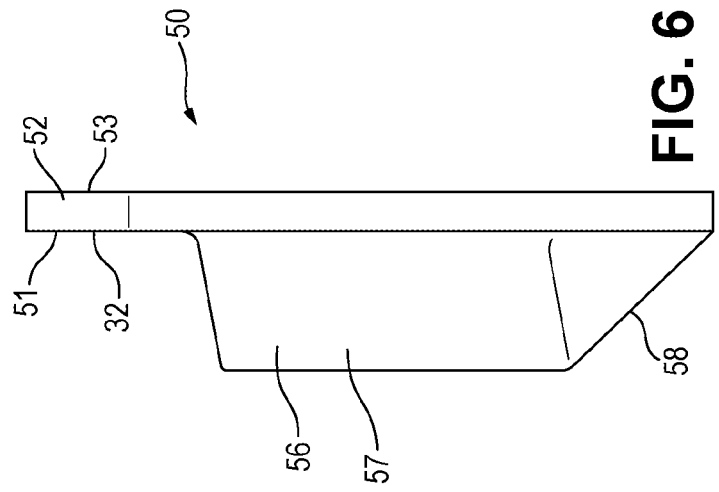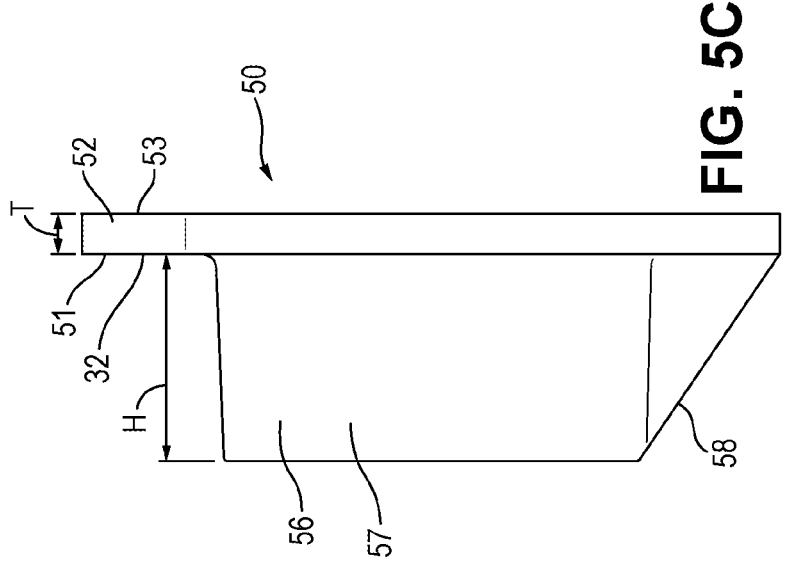

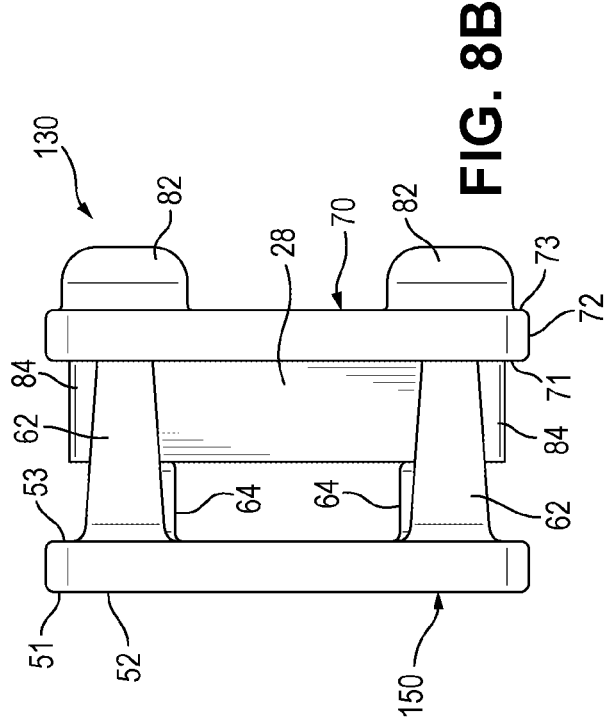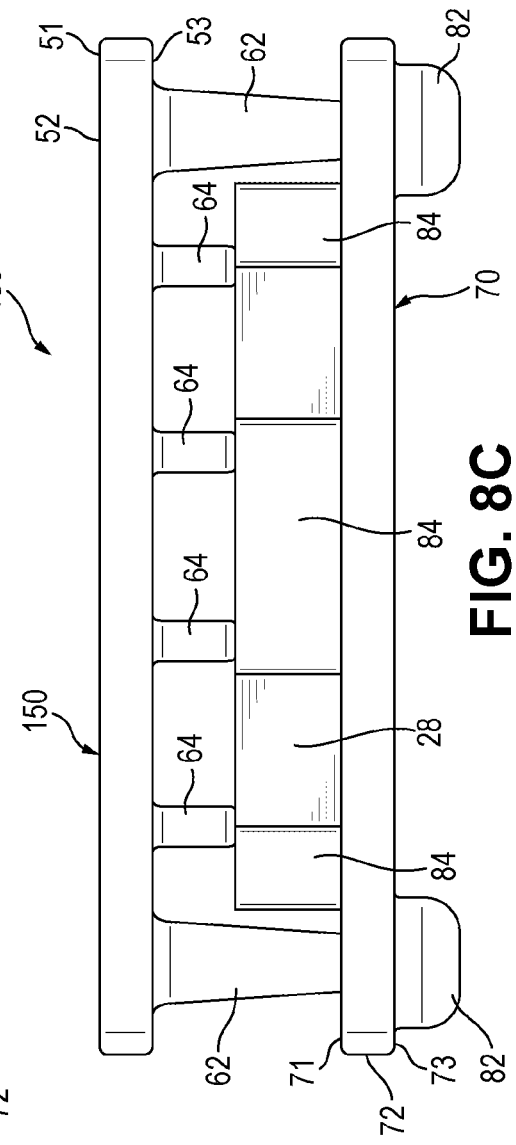

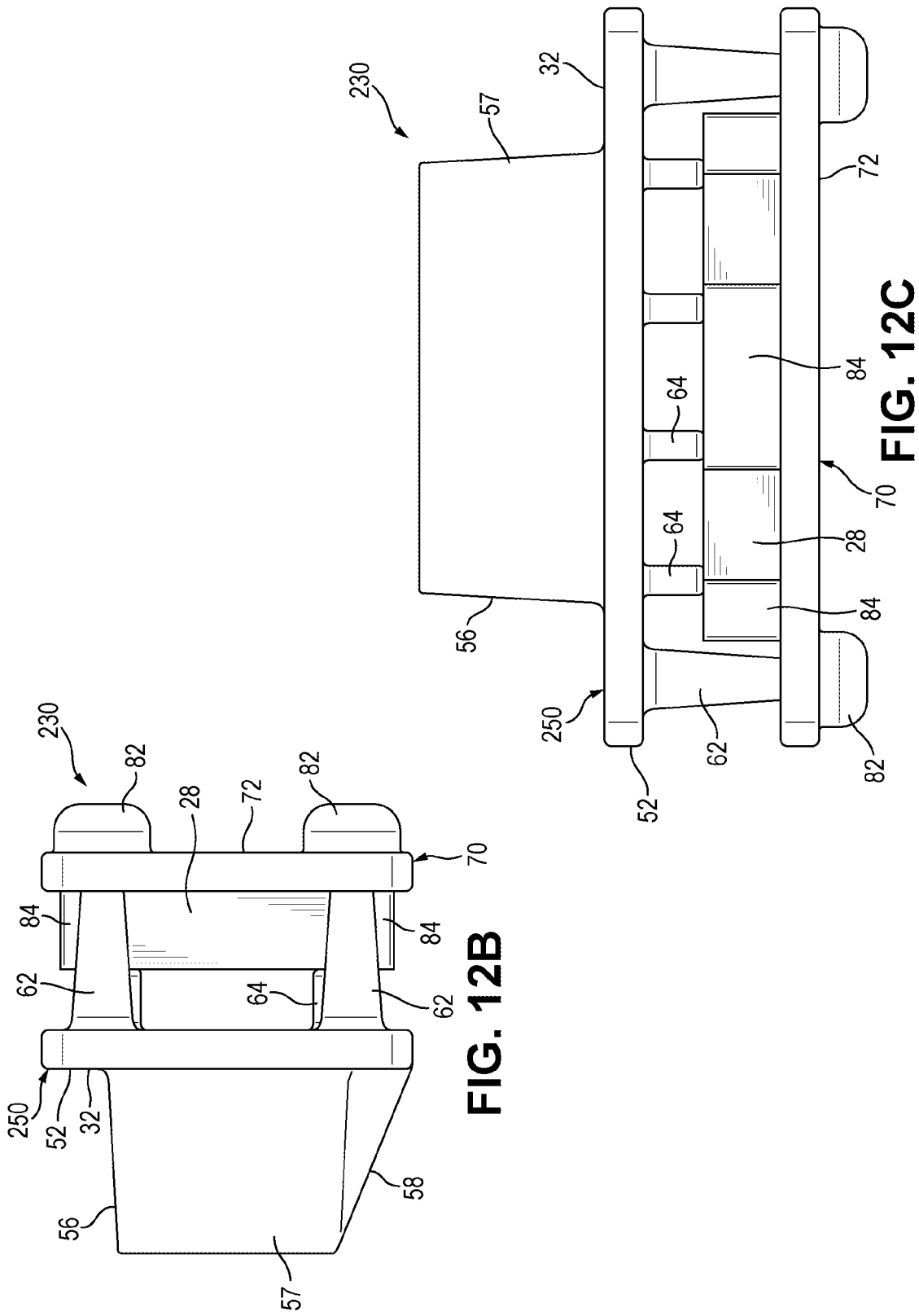

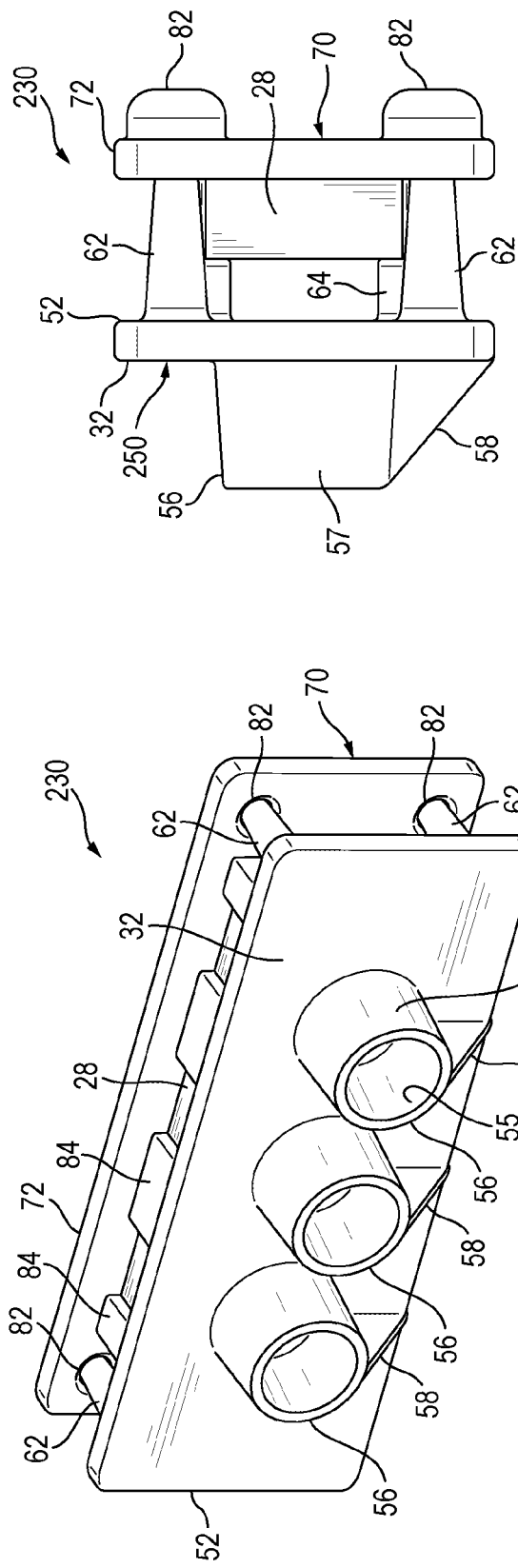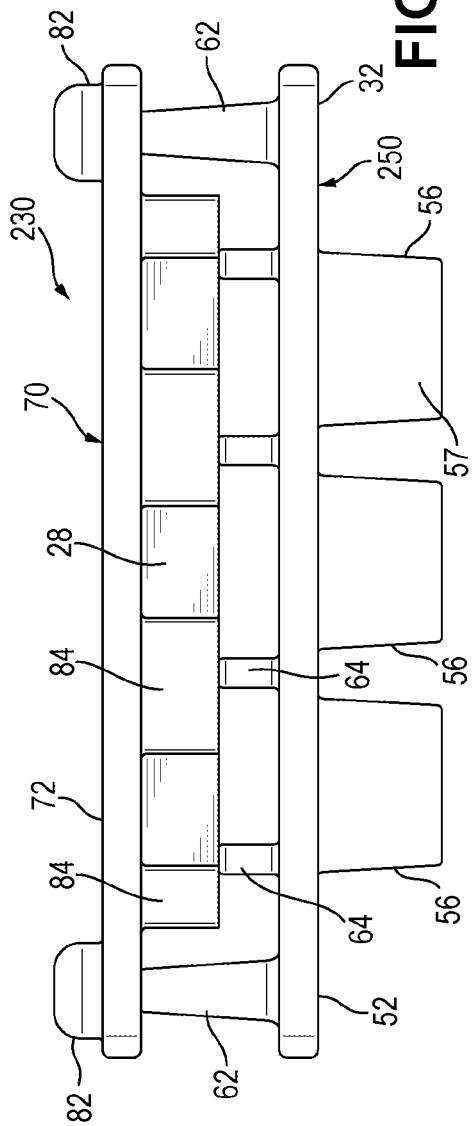

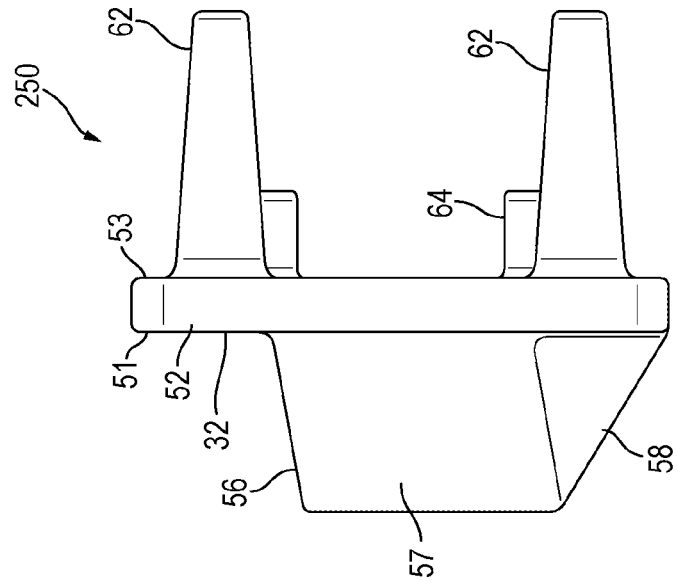
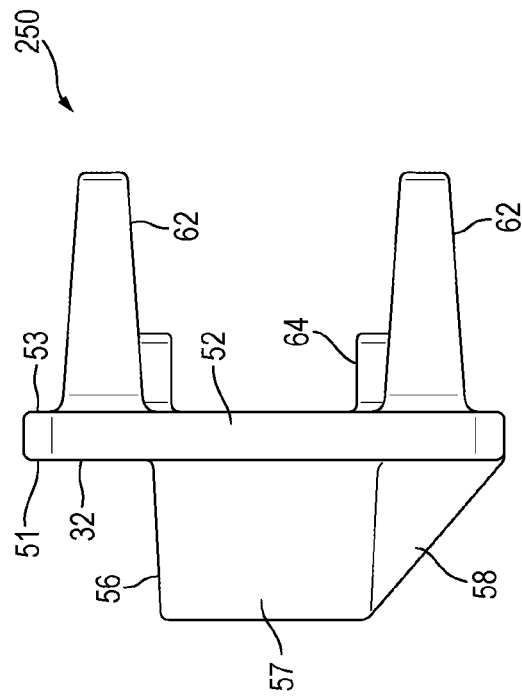
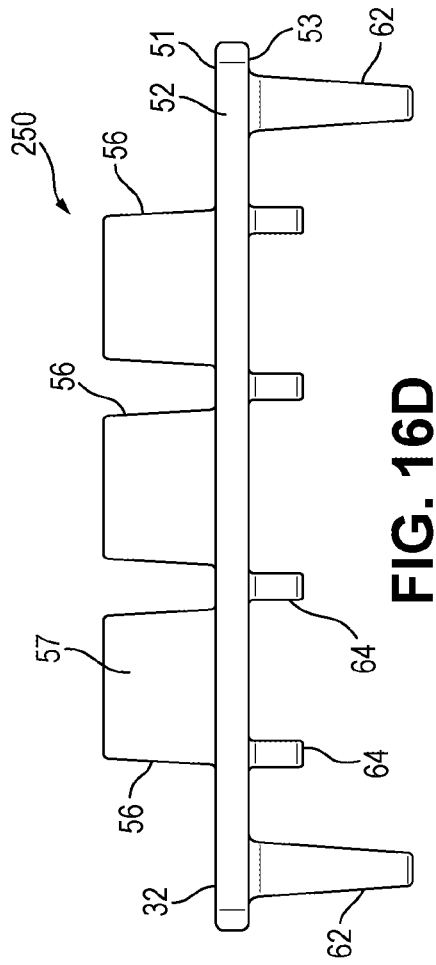
FIG. 17
FIG. 16C
FIG. 16D

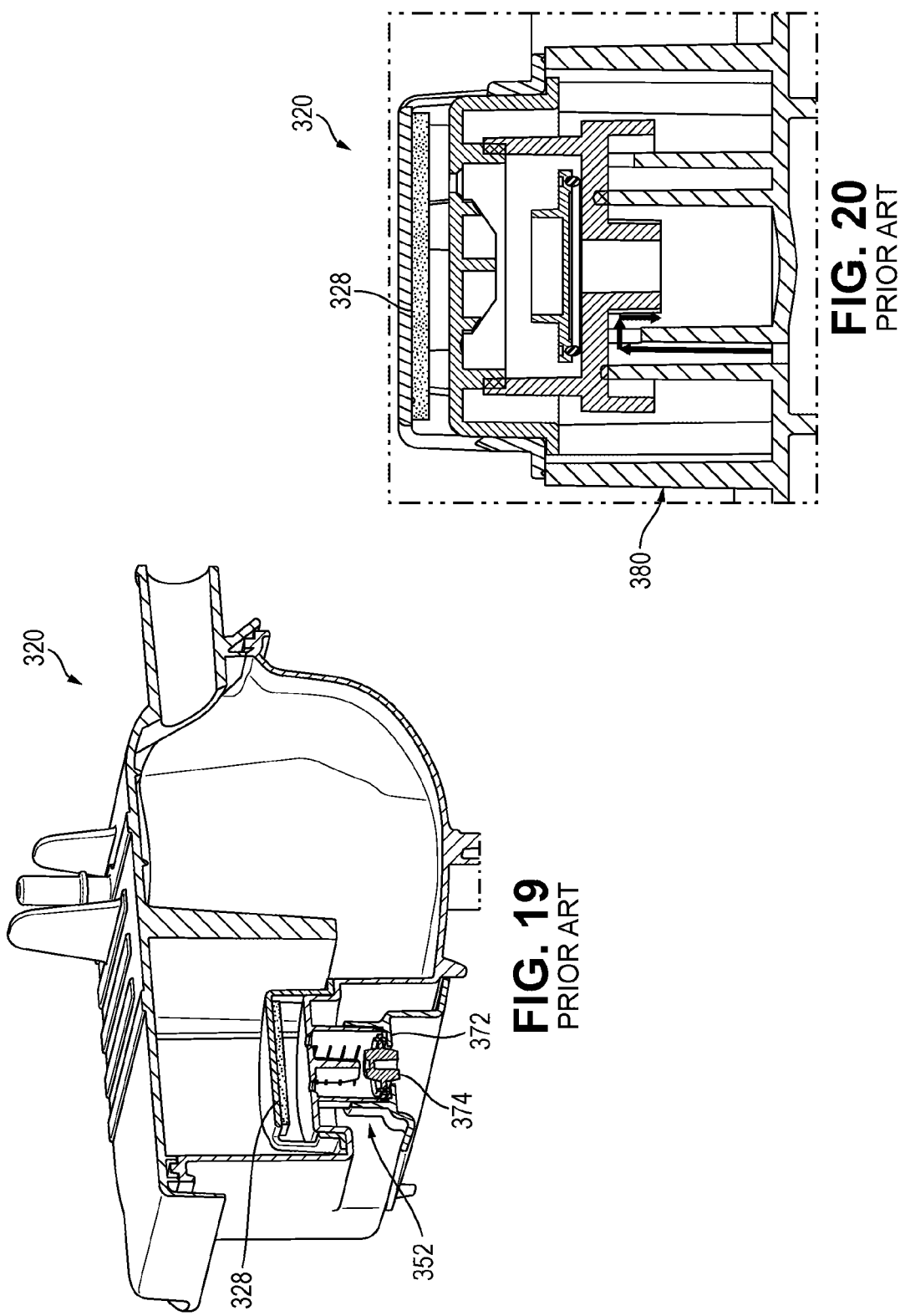

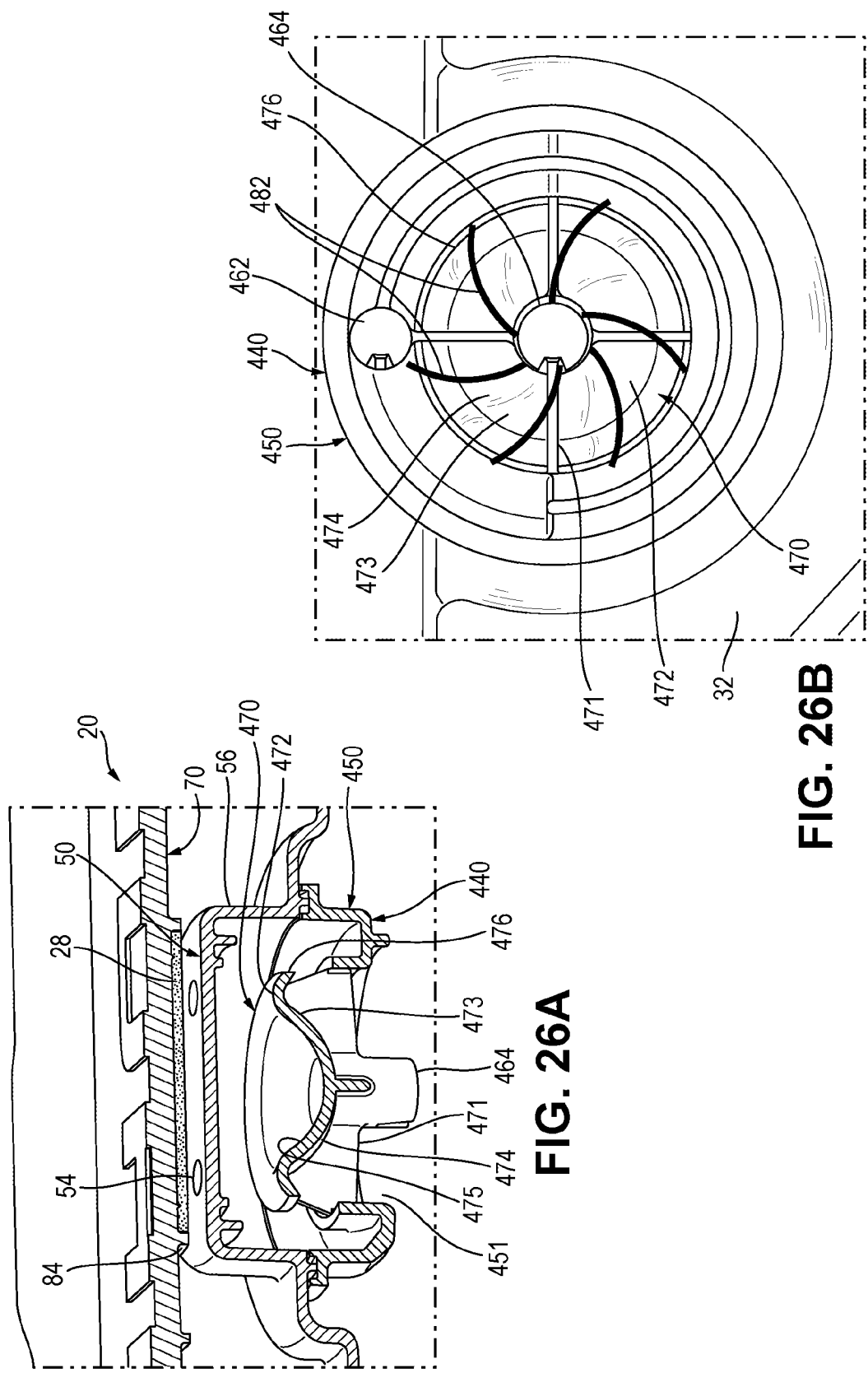

CHIMNEY FOR IMPACTOR NOZZLES AND INTEGRATED ASSEMBLY

CROSS-REFERENCE TO RELATED PATENT APPLICATIONS

This application is a continuation of PCT Application No. PCT/US2019/048116, filed Aug. 26, 2019, which claims priority to and the benefit of U.S. Provisional Patent Application No. 62/776,074, filed on Dec. 6, 2018. The contents of these applications are hereby incorporated by reference in their entirety.

FIELD

The present invention relates generally to air-oil separation assemblies.

BACKGROUND

In conventional air-oil separation assemblies with a nozzle plate, a large amount of oil enters through the impactor nozzles due to relatively ineffective pre-separation and a relatively high amount of oil. This oil moving through the impactor nozzles creates challenges to drain out the separated oil post-impaction.

In order to reduce the amount of oil moving through the impactor nozzles, restrictive pre-separation mechanisms may be used. However, these restrictive pre-separation mechanisms increase the velocity of the fluid, still allowing oil particles to reach the impaction nozzles from the adjacent surfaces. In order to achieve a higher separation efficiency, multiple different separation components may be added into the breather housing, which causes the packaging to be more difficult and increases cost.

FIGS. 1 and 2 show examples of conventional air-oil separation assemblies 320. In these conventional air-oil separation assemblies 320, both the nozzle plate 350 and the filter media 328 are usually welded into or inside the housing 322 of the conventional air-oil separation assembly 320. Accordingly, welding features are needed within the housing 322 to attach the filter media 328, and time in the assembly process must be devoted to welding the nozzle plates 350 and the filter media 328 within the housing 322.

In other conventional air-oil separation assemblies (as shown in FIG. 3, for example), the nozzle plate 350 and the impaction plate 370 may include pins 329 that penetrate into the conventional filter media 328, as described in U.S. Pat. No. 8,252,079 (the entire disclosure of which is hereby incorporated by reference herein) in order to secure the filter media 328 in position within the housing of the separation assembly. Furthermore, the impaction plate may be fastened to the filter media and/or held in position by the housing into which the impaction plate is inserted (along with the nozzle plate) in order to secure the filter media within the housing.

FIG. 19 shows another conventional air-oil separation assembly 320 that includes an impactor assembly 352 with a variable impactor 372 and a simple flat plate 372 is positioned before the variable impactor 374. Although the flat plate 372 prevents the direct entry of oil splash into the fixed section of the impactor assembly 352, oil can still splash into the variable section of the impactor assembly 352. Furthermore, any separated oil cannot effectively drain from the impactor assembly 352.

FIG. 20 shows still another conventional air-oil separation assembly 320 with a baffled pre-separation system 380 with weep holes for draining separated oil. However, based on computational fluid dynamics, the pre-separation system 380 results in a high pressure drop across the pre-separation system 380, which prevents the pre-separated oil from draining and also results in a high chance of oil carryover due to a higher fluid velocity.

SUMMARY

Various embodiments provide for a separation assembly that comprises a housing and a plate. The housing comprises an inlet and an outlet. The plate is positioned within the housing between the inlet and the outlet. The plate comprises a wall, at least one aperture, and at least one chimney comprising an inner surface surrounding the at least one aperture and an outer surface. The chimney extends from an upstream side of the wall and encompasses only a portion of a flow path between the inlet and the upstream side of the wall such that fluid flows radially beyond the outer surface of the at least one chimney in the housing between the inlet and the wall.

Various other embodiments provide for a separation assembly that comprises a housing and an impaction assembly. The housing comprises an inlet and an outlet. The impaction assembly comprises a nozzle plate, a filter media, and a media holder. The impaction assembly is positioned within the housing between the inlet and the outlet. The nozzle plate comprises at least one media spacer, and the media holder comprises at least one media support such that the filter media is positioned between the nozzle plate and the media holder and neither the nozzle plate nor the media holder penetrates into the filter media.

Various other embodiments provide for a separation assembly that comprises a housing and an impaction assembly. The housing comprises an inlet and an outlet. The impaction assembly comprises a nozzle plate, a filter media, and a media holder. The impaction assembly is positioned within the housing between the inlet and the outlet. The nozzle plate comprises at least one media spacer that spaces the filter media out from the nozzle plate. Neither the nozzle plate nor the media holder penetrates into the filter media.

Various other embodiments provide for a separation assembly that comprises a housing and an impaction assembly. The housing comprises an inlet and an outlet. The impaction assembly comprises a nozzle plate, a filter media, and a media holder. The impaction assembly is positioned within the housing between the inlet and the outlet. The media holder comprises at least one media support such that the filter media is positioned between the nozzle plate and the media holder. Neither the nozzle plate nor the media holder penetrates into the filter media.

Still other embodiments provide for a separation assembly that comprises an impaction assembly that comprises a nozzle plate, a filter media, and a media holder. The impaction assembly is positionable between an inlet and an outlet. The nozzle plate comprises at least one media spacer, and the media holder comprises at least one media support such that the filter media is positioned between the nozzle plate and the media holder and neither the nozzle plate nor the media holder penetrates into the filter media.

Other embodiments provide for a nozzle plate positionable between an inlet and an outlet of a housing and for use in a separation assembly. The nozzle plate comprises a wall, at least one aperture, and at least one chimney comprising an inner surface surrounding the at least one aperture and an outer surface. The at least one chimney extends from an upstream side of the wall and encompasses only a portion of a flow path between the inlet of the housing and the upstream side of the wall such that fluid flows radially beyond the outer surface of the at least one chimney between the inlet of the housing and the wall when the nozzle plate is positioned in the housing.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 5A is a perspective view of a nozzle plate of the separation assembly of FIG. 4.

FIG. 5B is a front view of the nozzle plate of FIG. 5A.

FIG. 5C is a side view of the nozzle plate of FIG. 5A.

FIG. 5D is a top view of the nozzle plate of FIG. 5A.

FIG. 6 is a side view of a nozzle plate according to another embodiment.

FIG. 8B is a side view of the impaction assembly of FIG. 8A in a horizontal orientation.

FIG. 8C is a top view of the impaction assembly of FIG. 8A.

FIG. 12B is a side view of the impaction assembly of FIG. 12A in a horizontal orientation.

FIG. 12C is a top view of the impaction assembly of FIG. 12A.

FIG. 15A is a perspective view of an impaction assembly according to another embodiment.

FIG. 15B is a side view of the impaction assembly of FIG. 15A in a horizontal orientation.

FIG. 15C is a top view of the impaction assembly of FIG. 15A in a vertical orientation.

FIG. 16C is a side view of the nozzle plate of FIG. 16A in a horizontal orientation.

FIG. 16D is a top view of the nozzle plate of FIG. 16A in a vertical orientation.

FIG. 17 is a side view of a nozzle plate according to another embodiment.

FIG. 19 is a cross-sectional, perspective view of a conventional separation assembly.

FIG. 20 is a cross-sectional view of another conventional separation assembly.

FIG. 26A is a cross-sectional view of a separation assembly according to yet another embodiment.

FIG. 26B is a bottom view of the separation assembly of FIG. 26A.

DETAILED DESCRIPTION

Referring to the figures generally, various embodiments disclosed herein relate to various separation assemblies with various nozzle plates and various pre-separation assemblies. As described further herein, the nozzle plates may include a chimney, nozzle plate interlocking features, and/or media spacers in order to prevent oil from flowing through the nozzle plate, to attach to a media holder, and to secure a filter media, respectively.

Chimney for Impactor Nozzles

Figure 1:
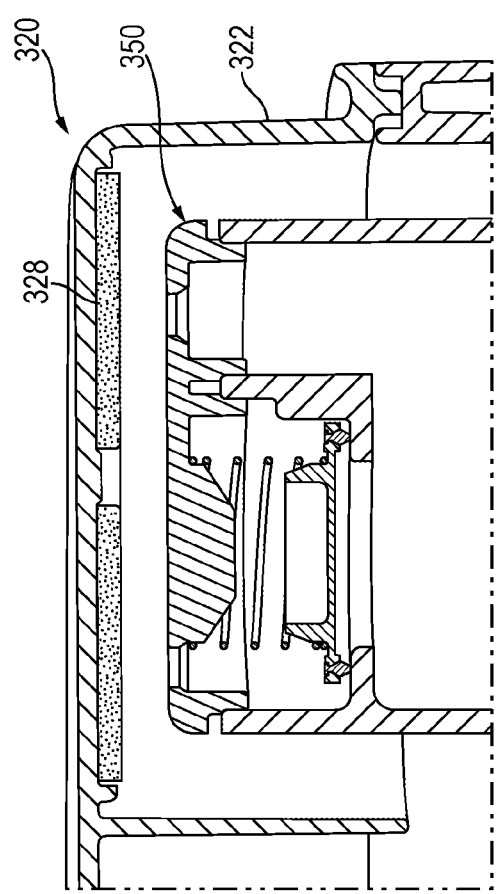
FIG. 1 is a cross-sectional view of a conventional separation assembly.
Figure 2:
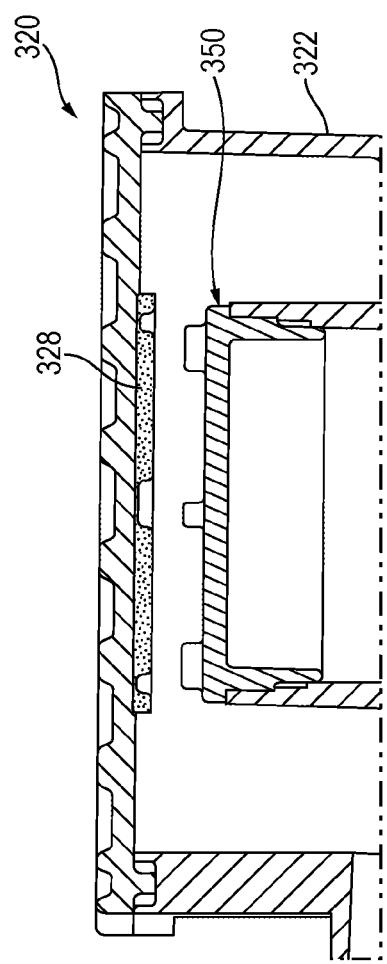
FIG. 2 is a cross-sectional view of another conventional separation assembly.
Figure 3:
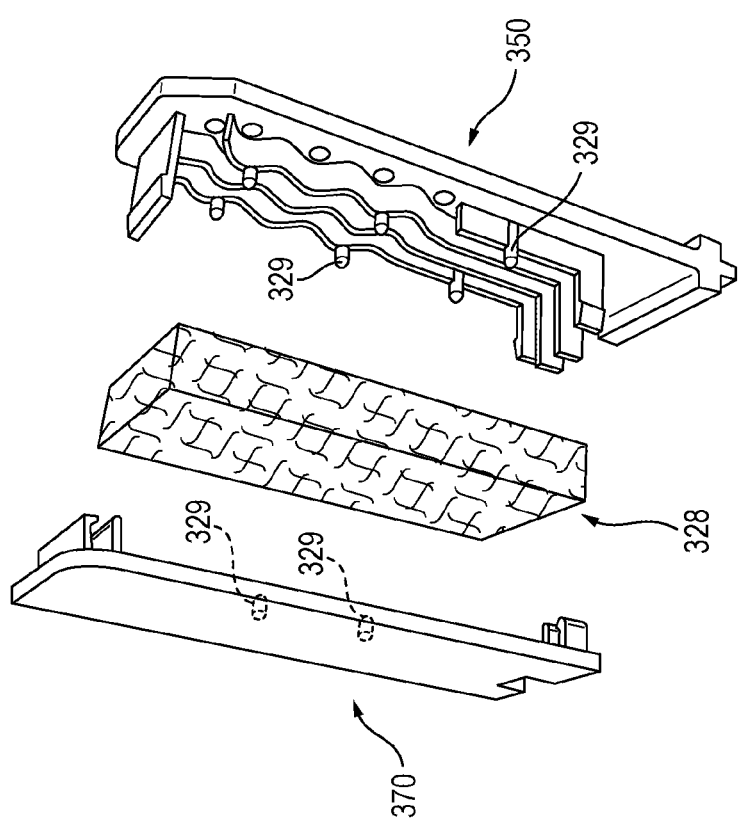
FIG. 3 is an exploded, perspective view of a conventional nozzle plate and impactor plate.
Figure 4:
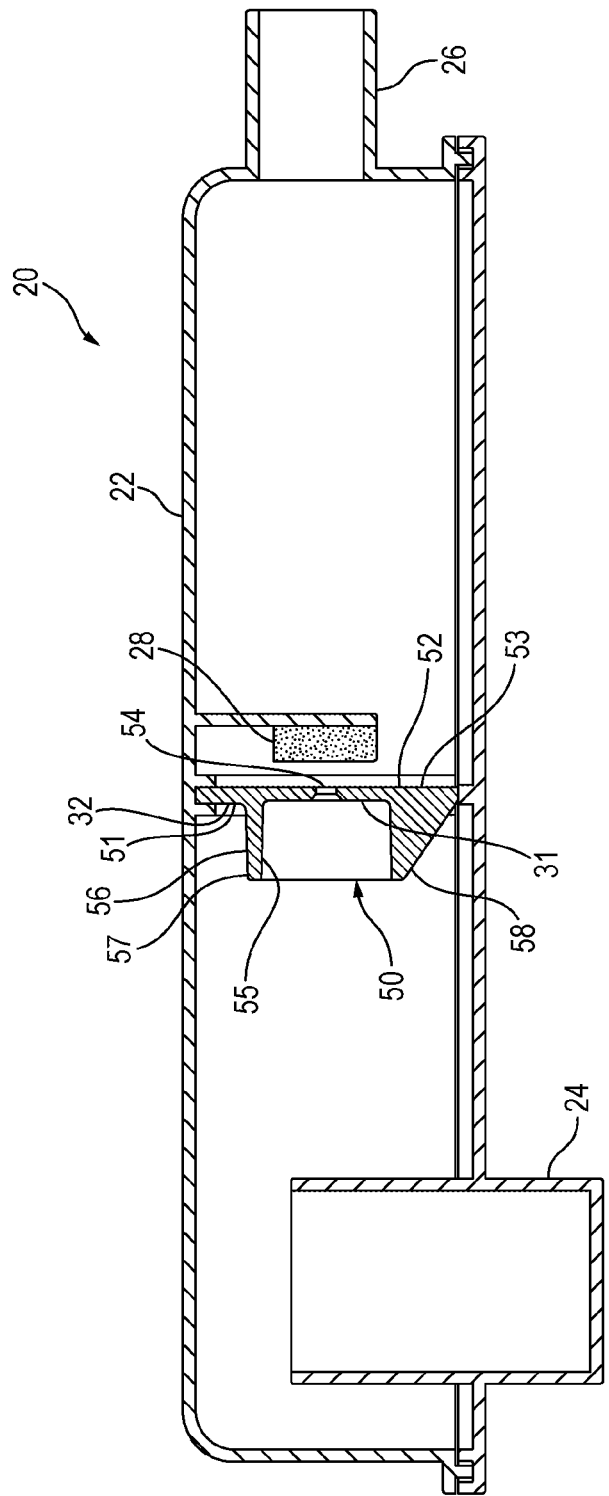
FIG. 4 is a cross-sectional view of a separation assembly according to one embodiment.

FIG. 4 shows one embodiment of an air-oil separator or separation assembly 20 (e.g., a crankcase ventilator). The separation assembly 20 may comprise, for example, an impactor crankcase ventilation system. The separation assembly 20 includes a housing 22, an inlet 24, an outlet 26, a filter media 28, and a nozzle plate 50 (and optionally an impaction assembly 130 or 230 and/or a pre-separator 440, as shown and described further herein). The filter media 28 is configured to filter a fluid. The nozzle plate 50 (and optionally an impaction assembly 130 or 230) is positioned within the housing 22 between the inlet 24 and the outlet 26. If included, the pre-separator 440 (as shown in FIGS. 21-28) is positioned upstream of the nozzle plate 50 (and the impaction assembly 130 or 230). Accordingly, the fluid flows into the housing 22 of the separation assembly 20 through the inlet 24, subsequently through the pre-separator 440 (if included), and then subsequently flows through the nozzle plate 50 (or the impaction assembly 130 or 230). The nozzle plate 50 then directs the fluid onto and at least partially through the filter media 28 for filtration, and subsequently exits out of the housing 22 through the outlet 26. Accordingly, the nozzle plate 50 (as well as the impaction assembly 130 or 230 and the pre-separator 440) is positioned upstream from the filter media 28 within the housing 22.

As shown in FIGS. 4-7C, the impactor nozzle structure or plate (referred to herein as the impactor nozzle plate 50) comprises a wall 52, at least one aperture (referred to herein as an impactor nozzle 54), and at least one nozzle chimney 56. The wall 52 includes an upstream side 51 (e.g., a first side) and a downstream side 53 (e.g., a second side). Since the nozzle plate 50 is upstream from the filter media 28, the upstream side 51 of the wall 52 is the side of the wall 52 that is further from the filter media 28, and the downstream side 53 of the wall 52 is the side of the wall 52 that is closer to the filter media 28. The nozzle plate 50 may be a fixed or variable impactor. Although the nozzle plate 50 is shown with the filter media 28, it is understood that the nozzle plate 50 may be used without any filter media. However, although the nozzle plate 50 and the nozzle 54 are referred to herein, it is understood that, in some embodiments (such as FIGS. 24-25, as described further herein), the nozzle plate 50 may be another type of plate and the nozzle 54 may be an aperture 61.

The wall 52 is substantially flat and extends radially along and beyond the inner surface 55 and the outer surface 57 of the chimney 56 (along the downstream end of the chimney 56). The wall 52 closes off the downstream end of the chimney 56 such that all fluid flowing downstream through the chimney 56 is directed through the at least one nozzle 54. At least a portion of the wall 52 (such as the outer edges of the wall 52) may provide an area to easily attach to the housing 22 of the separation assembly 20, as shown in FIG. 4. Accordingly, the nozzle plate 50 may optionally attach to the housing 22 without any welding.

The apertures, through-holes, orifices, or nozzles 54 extend completely through the plate or wall 52 in order to allow fluid to move from the upstream side 51 of the wall 52 to the downstream side 53 of the wall 52. Although a plurality of nozzles 54 are shown, it is understood that the nozzle plate 50 may comprise a single nozzle 54.

The nozzle plate 50 also includes a bracket or gusset 58 that is positioned along the outer surface 57 of the chimney 56 and vertically below the chimney 56. The gusset 58 extends from the outer surface 57 of the chimney 56 and the upstream side 51 of the wall 52. The end surface of the gusset 58 extends at an angle between the top portion of the chimney 56 and the upstream side 51 of the wall 52 along at least a portion of the height of the chimney 56. The gusset 58 may extend from the upstream side 51 of the wall 52 along the entire height of the chimney 56 and from the outer surface 57 of the chimney 56 to an edge of the wall 52. The gusset 58 helps guide any oil from the fluid to drain downward from the chimney 56 (i.e., away from the nozzle 54), as well as strengthens the chimney 56.

The shroud, shield, or chimney 56 extends from the upstream side 51 of the wall 52 (in a direction away from the filter media 28, as shown in FIG. 4). The chimney 56 is positioned and extends completely around at least one nozzle 54 along the upstream side 51 of the wall 52, the inner surface 55 of the chimney 56 completely circumferentially surrounding the outer perimeter of the at least one nozzle 54. In particular, the inner surface 55 of the chimney 56 completely surrounds a through-axis defined by the at least one nozzle 54 (extending axially through the nozzle 54) in order to direct fluid into the nozzle 54 and through the wall 52 and to prevent oil from entering into the nozzle 54. Accordingly, the chimney 56 is positioned upstream from the nozzle 54 along the wall 52. The impactor (e.g., the nozzle plate 50, and in particular the wall 52) may be integrally formed as a single-unit (i.e., that cannot be separated without destruction) with the chimney 56.

Due to the configuration of the chimney 56, the chimney 56 increases the effectiveness of the oil separation within the separation assembly 20. In particular, the chimney 56 prevents separated oil particles or drops from entering, intruding, or draining into the nozzles 54 (and thereby overwhelming the nozzles 54) from adjacent surfaces (e.g., from the upstream side 51 of the wall 52, outside of the chimney 56), which would have negatively impacted the performance of the separation assembly 20. The chimney 56 decreases the tooling cost, improves the assembly and manufacturing process, and optimizes the performance of the separation assembly 20 compared to conventional air-oil separation assemblies.

Figure 7C:
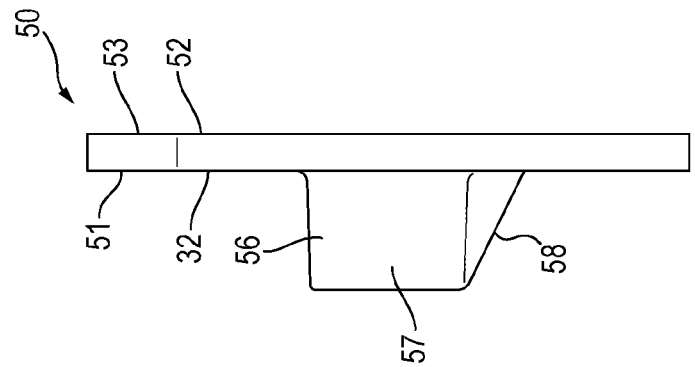
FIG. 7C is a side view of the nozzle plate of FIG. 7A.
Figure 7A:
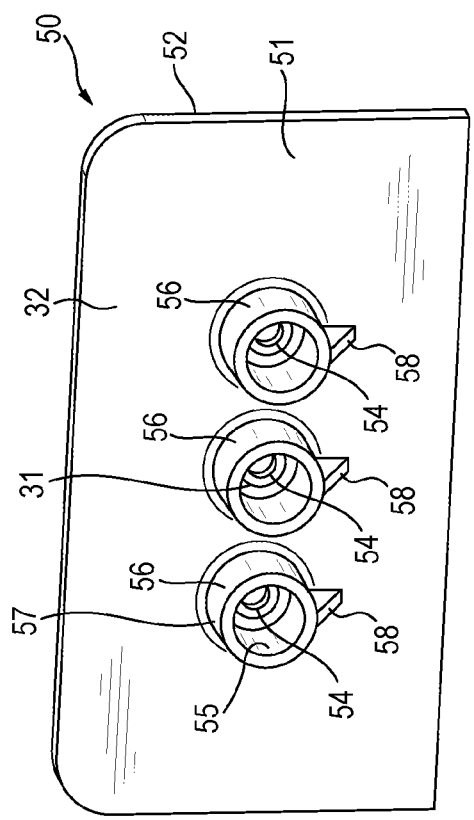
FIG. 7A is a perspective view of a nozzle plate according to yet another embodiment.
Figure 7B:
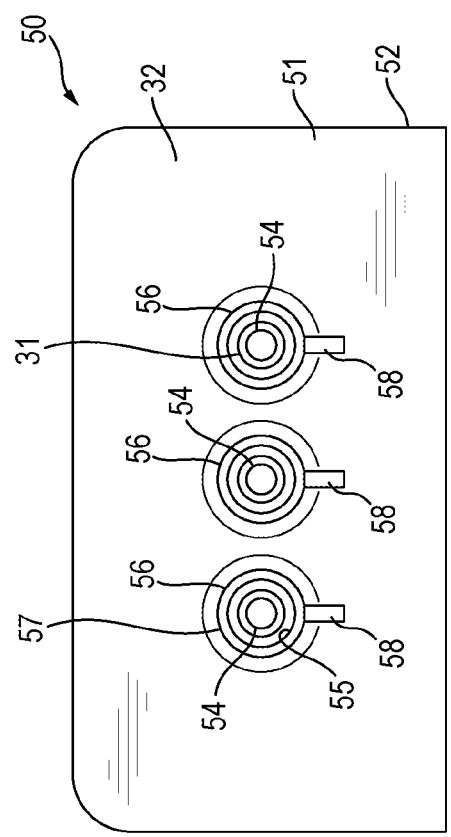
FIG. 7B is a front view of the nozzle plate of FIG. 7A.

The chimney 56 comprises an outer wall that extends out from the upstream side 51 of the wall 52 of the nozzle plate 50 and extends completely around the through-axis of the at least one nozzle 54. The outer wall comprises an inner side or surface 55 and an outer side or surface 57. The inner surface 55 of the outer wall defines a through-hole that extends completely through the chimney 56 and leads to the at least one nozzle 54 (the longitudinal axis of which is completely surrounded by the chimney 56). The outer wall of the chimney 56 may have a variety of different shapes. For example, as shown in FIGS. 5A-5B, the chimney 56 may have an oval cross-section (taken along a plane approximately parallel to the wall 52). However, it is understood that the chimney 56 may have a variety of different cross-sectional shapes (taken along a plane approximately parallel to the wall 52) including but not limited to circular (as shown in FIGS. 7A-7C), rectangular, or irregular shapes.

The chimney 56 encompasses only a portion of the cross-sectional area of a flow path flowing from the inlet 24 of the housing 22 to the upstream side 51 of the wall 52, upstream of the nozzles 54, where the cross-section is taken substantially parallel to the wall 52 and substantially perpendicular to the flow direction. With this arrangement, the chimney 56 radially encompasses only a portion (i.e., an inner portion 31) of the upstream side 51 of the wall 52, and an outer portion 32 of the upstream side 51 of the wall 52 is outside of and radially encompasses the chimney 56 (and an inner surface of the housing 22 radially encompasses the outer portion 32 of the upstream side 51 of the wall 52). Both the inner portion 31 and the outer portion 32 of the upstream side 51 of the wall 52 are upstream of the nozzles 54 and exposed to fluid flow from the inlet 24. The nozzles 54 extend through the inner portion 31 of the upstream side 51 of the wall 56 such that all fluid flowing through the nozzles 54 is first encompassed by and flows through the chimney 56. The fluid that flows to and reaches the outer portion 32 of the upstream side 51 of the wall 52 does not first flow through the chimney 56.

Accordingly, fluid flows both within the chimney 56 (along the inner surface 55 of the chimney 56 to the nozzles 54 and along the inner portion 31 of the upstream side 51 of the wall 52) and radially outside of the chimney 56 (along and radially beyond the outer surface 57 of the chimney 56 and along the outer portion 32 of the upstream side 51 of the wall 52) in the housing 22 between the inlet 24 and the upstream side 51 of the wall 52, upstream of the nozzles 54. This space between the outer surface 57 of the chimney 56 and an inner surface of the housing 22 (radially outside of the chimney 56, along the outer portion 32 of the upstream side 51 of the wall 52) creates a "dead zone" or recirculation zone for the fluid. Comparatively, conventional chimneys encompass the entire flow path upstream of the nozzles.

The chimney 56 may also be in a variety of different sizes. According to one embodiment, the flow area provided by the chimney 56 (i.e., the area of the through-hole of the chimney 56 taken along a cross-section of the chimney 56 parallel to the wall 52 and perpendicular to the flow of fluid through the chimney 56 and the at least one nozzle 54) is at least twice the flow area provided by the at least one nozzle 54 that the chimney 56 surrounds. The inner dimensions (e.g., the inner diameter) of the chimney 56 are significantly larger than the inner diameter of the at least one nozzle 54. Accordingly, the chimney 56 does not significantly adversely contract the fluid flow or add to the pressure drop of the flow through the nozzle plate 50. Due to the size difference between the chimney 56 and the nozzles 54, at least a portion of the upstream side 51 of the wall 52 may be positioned radially in between the inner circumference of the downstream end of the chimney 56 and the upstream end of the nozzle 54.

The height H of the chimney 56 (i.e., the distance between the upstream end of the chimney 56 and the downstream end of the chimney 56 that is along the upstream side 51 of the wall 52, as shown in FIG. 5C) may vary according to the desired configuration. As shown in FIG. 5C, the outer wall of the chimney 56 (along the height H of the chimney 56) extends substantially from the upstream side 51 of the wall 52 relative to the thickness T of the wall 52. For example, the height H of the chimney 56 may be approximately 3-6 times the thickness T of the wall 52 (and thus the depth of the at least one nozzle 54). According to one set of embodiments, the height H of the chimney 56 is greater than approximately 1 millimeter (mm) (10 mm in a more particular embodiment).

As shown in FIGS. 5C-6, the nozzle plate 50 (and therefore the chimney 56) may be oriented in a variety of different orientations or directions, such as horizontal (e.g., where the chimney 56 and the wall 52 are next to each other horizontally, as shown in FIG. 5C), vertical (e.g., where the chimney 56 is vertically above or below the wall 52, as shown in FIG. 5D), or at an angle or inclined (as shown in FIG. 6). The angled orientation may refer to when the entire nozzle plate 50 is at a position in between the horizontal position and the vertical position. Alternatively or additionally, the chimney 56 (and therefore the outer wall of the chimney 56) may extend from the upstream side 51 of the wall 52 at an oblique angle. According to other embodiments, the chimney 56 extends from the upstream side 51 of the wall 52 at an approximately perpendicular angle (as shown in FIG. 5C).

According to one embodiment as shown in FIGS. 5A-6, the nozzle plate 50 comprises a single chimney 56 that surrounds multiple nozzles 54 (e.g., all or some of the nozzles 54 on the nozzle plate 50). The chimney 56 may surround any number of nozzles 54. Alternatively, the nozzle plate 50 may include multiple chimneys 56 that each surround multiple nozzles 54.

According to another embodiment as shown in FIGS. 7A-7B, the nozzle plate 50 comprises one chimney 56 that individually surrounds only one nozzle 54. Accordingly, the nozzle plate 50 may include multiple chimneys 56 in order to surround each of the nozzles 54. Alternatively, the nozzle plate 50 may include one chimney 56 that surrounds one nozzle 54. If the nozzle plate 50 comprises one nozzle 54, the nozzle 54 is approximately centered within the chimney 56. If the nozzle plate 50 comprises a plurality of nozzle 54, the nozzles 54 are distributed evenly about the area provided by the chimney 56 (and optionally may be aligned with each other in a line).

Impaction Assembly

FIGS. 8A-11 show an impaction assembly 130 that can be used within the separation assembly 20 and positioned within the housing 22 (and fixed inside to the housing 22 with various support features), which are shown in FIG. 4. The separation assembly 20 may further comprise the impaction assembly 130, which includes the nozzle plate 150. The impaction assembly 130 is simple, cost effective (in particular in regard to the assembly costs), compact, and efficient. Furthermore, the impaction assembly 130 makes assembly and manufacturing relatively easier compared to conventional air-oil separation assemblies, does not require nozzle plate welding, media welding, or vibration welding, and reduces the overall assembly process time.

Figure 8A:
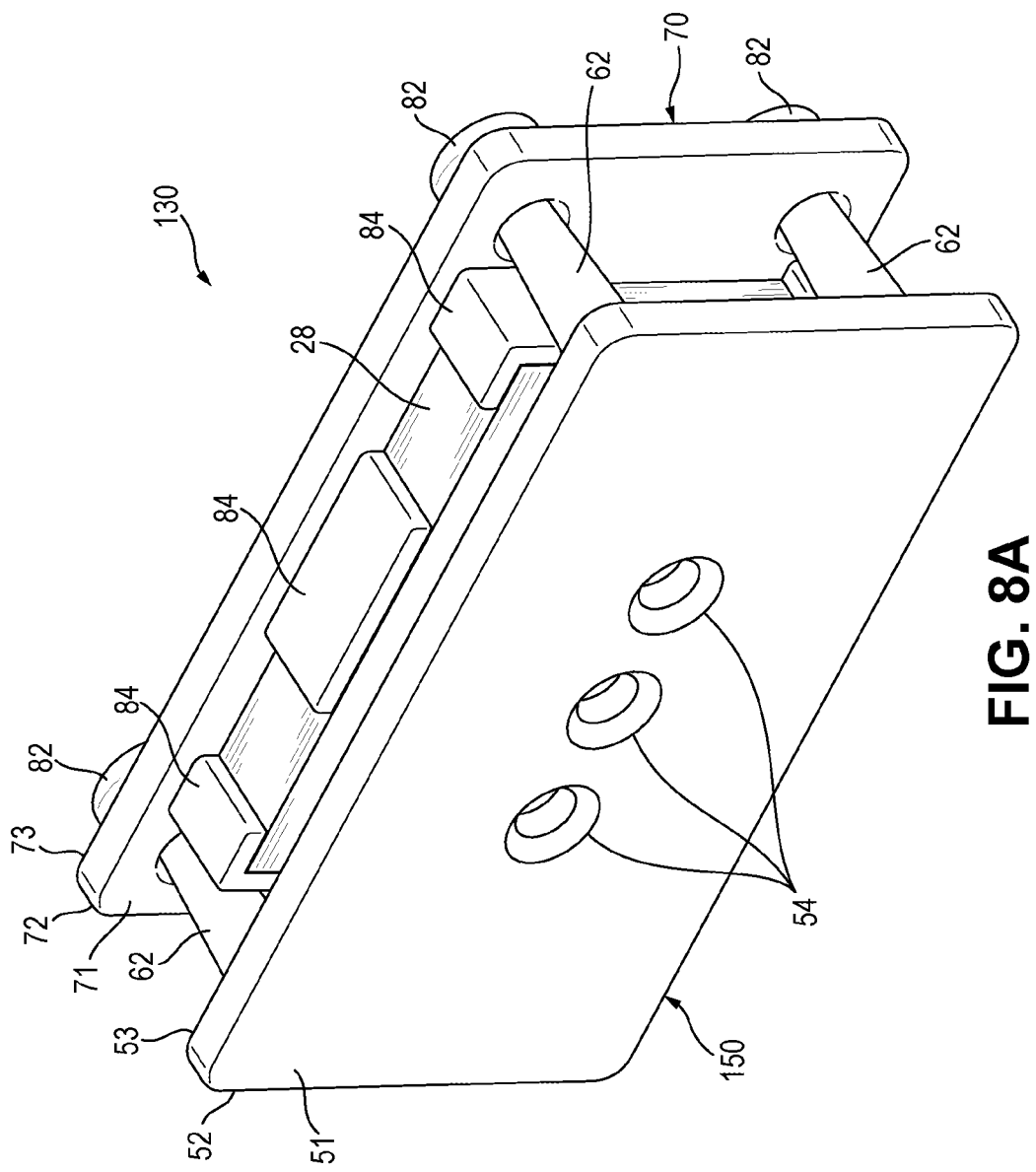
FIG. 8A is a perspective view of an impaction assembly according to one embodiment.

As shown in FIGS. 8A-8C, the impaction assembly 130 comprises a nozzle plate 150, the filter media 28, and a media holder 70. As shown in FIGS. 8B-8C, the impaction assembly 130 may be oriented in a variety of different orientations or directions, such as horizontal (e.g., where the nozzle plate 150 and the media holder 70 are next to each other horizontally, as shown in FIG. 8B), vertical (e.g., right-side up, where the nozzle plate 150 is vertically above the media holder 70 (as shown in FIG. 8C) or upside-down, where the nozzle plate 150 is vertically below the media holder 70), or at an angle or inclined. The angled orientation may refer to when the entire impaction assembly 130 is at a position in between the horizontal position and the vertical position.

Figure 9:
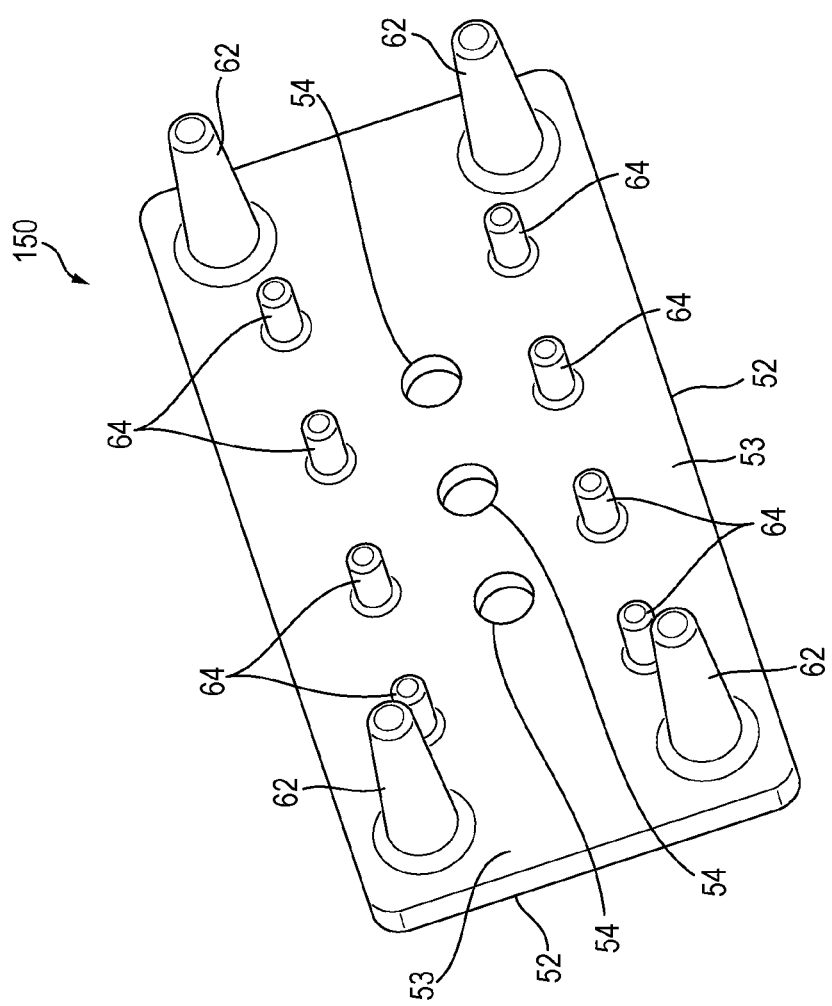
FIG. 9 is a perspective view of a nozzle plate of the impaction assembly of FIG. 8A.

The nozzle plate 150 (as shown in FIG. 9) is similar to and includes the various features, benefits, and components of the nozzle plate 50, except where noted otherwise. Like reference numbers are used where applicable. However, the nozzle plate 150 does not include a chimney or the corresponding gusset. As described further herein, the nozzle plate 150 further comprises at least one nozzle plate interlocking feature 62 and at least one media spacer 64. The nozzle plate 150 is positioned upstream from the filter media 28 and the media holder 70.

Figure 10C:
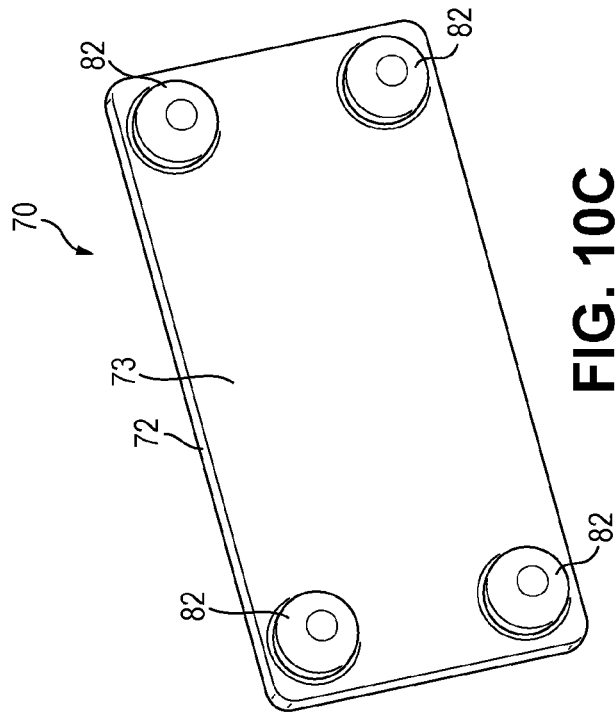
FIG. 10C is a back, perspective view of the media holder of FIG. 10A.
Figure 10A:
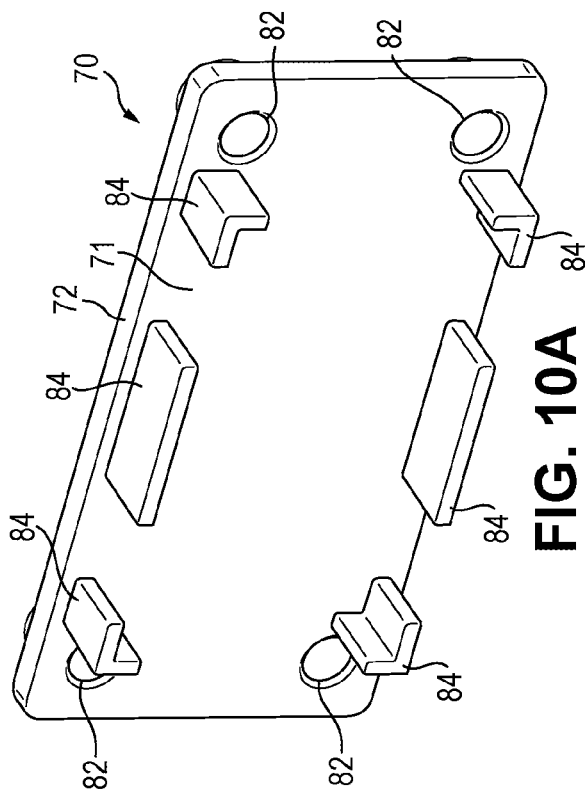
FIG. 10A is a front, perspective view of a media holder of the impaction assembly of FIG. 8A.
Figure 10B:
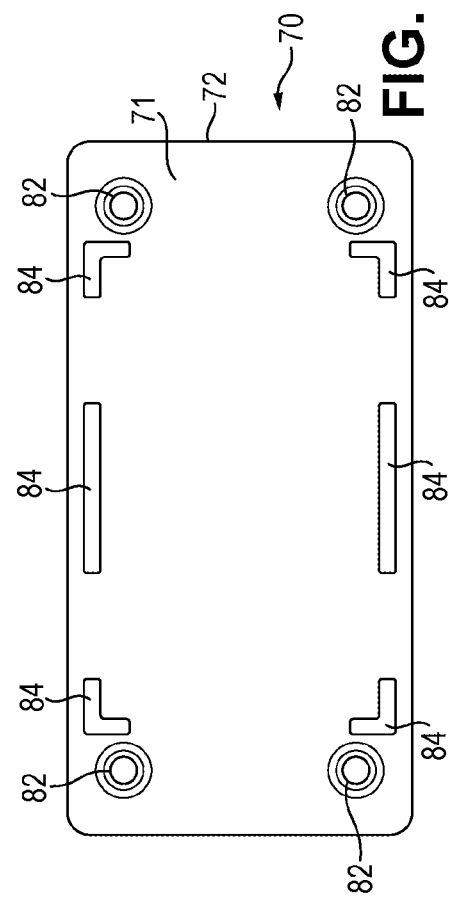
FIG. 10B is a front view of the media holder of FIG. 10A.

The backing plate, impactor plate, media support plate, or media holder 70 is downstream from the nozzle plate 150 and the filter media 28 within the housing 22 of the separation assembly 20. The media holder 70 is configured to attach to the nozzle plate 150 and to support the filter media 28 (as described further herein). As shown in FIGS. 10A-10C, the media holder 70 comprises a wall 72, at least one media holder interlocking feature 82, and at least one media support 84 (as described further herein). The wall 72 includes an upstream side 71 (e.g., a first side) and a downstream side 73 (e.g., a second side). Since the media holder 70 is downstream from the filter media 28, the upstream side 71 of the wall 72 is the side of the wall 72 that is closer to the filter media 28, and the downstream side 73 of the wall 72 is the side of the wall 72 that is further from the filter media 28. As shown in FIGS. 10A-10B, along at least the portion of the wall 72 that the filter media 28 is positioned along, the wall 72 fully encloses the downstream side of the filter media 28. Accordingly, the wall 72 does not have any holes or apertures through which fluid can flow (along the area that the filter media 28 extends) when the separation assembly 20 is assembled together.

The nozzle plate 150 and the media holder 70 are operatively coupled or attached to each other with various interlocking features with the filter media 28 sandwiched and secured in between the filter media 28 and the media holder 70, as shown in FIGS. 8A-8C. Accordingly, the filter media 28 is positioned and secured in between the downstream side 53 of the wall 52 of the nozzle plate 150 and the upstream side 71 of the wall 72 of the media holder 70 such that the filter media 28 is downstream from the nozzle plate 150 and upstream from the media holder 70. The filter media 28 is positioned directly along the upstream side 71 of the wall 72 and is spaced apart from the downstream side 53 of the wall 52 (as shown in FIGS. 8B-8C). The interlocking features 62, 82 are configured to space the nozzle plate 150 and the media holder 70 out from each other at a certain distance in order to allow sufficient room for the filter media 28 to be positioned and secured in between the nozzle plate 150 and the media holder 70, with space in between the downstream side 53 of the nozzle plate 150 and the upstream side of the filter media 28. The distance between the downstream side 53 of the nozzle plate 150 and the upstream side of the filter media 28 is 0 mm or more.

To attach the nozzle plate 150 to the media holder 70, the nozzle plate 150 comprises at least one nozzle plate interlocking feature 62 along at least the downstream side 53 of the wall 52 (as shown in FIG. 9), and the media holder 70 comprises at least one media holder interlocking feature 82 along at least the upstream side 71 of the wall 72 (as shown in FIGS. 10A-10B). The nozzle plate interlocking feature 62 and the media holder interlocking feature 82 are complementary to each other in shape, size, and location along the nozzle plate 150 and the media holder 70, respectively, and are interlockable and attachable with each other in order to attach the nozzle plate 150 to the media holder 70. The interlocking features 62, 82 may be positioned along or near each of the corners of the nozzle plate 150 and the media holder 70, respectively, such that the interlocking features 62, 82 are outside of the outer edges and the entire outer perimeter of the filter media 28. For example, the nozzle plate 150 and the media holder 70 may each include a plurality of respective interlocking features 62, 82, such as four of the respective interlocking features 62, 82 along each corner. Accordingly, the filter media 28 fits within the space or area defined by the interlocking features 62, 82. However, according to one embodiment, the interlocking features 62, 82 do not fully enclose the filter media 28 (in particular the sides of the filter media 28) between the nozzle plate 150 and the media holder 70 in order to provide at least one area for fluid to exit out the side from the area between the nozzle plate 150 and the media holder 70.

The attachment of nozzle plate interlocking feature 62 and the media holder interlocking feature 82 depends on the respective configuration of each interlocking feature. For example, the nozzle plate interlocking feature 62 and the media holder interlocking feature 82 may have a close tolerance fit. According to one embodiment as shown in FIGS. 8A-10C, the nozzle plate interlocking feature 62 is a circular post, and the media holder interlocking feature 82 is a circular hole with a certain depth that is configured to receive and secure an end of the circular post. The end of the circular post fits at least partially inside the circular hole in order to attach the nozzle plate 150 and the media holder 70 together. Depending on the configuration of the circular hole, the hole may extend into the upstream side 71 of the wall 72 and protrude outwardly from the downstream side 73 of the wall 72 (as shown in FIGS. 8B-8C and 10C).

Figure 11:
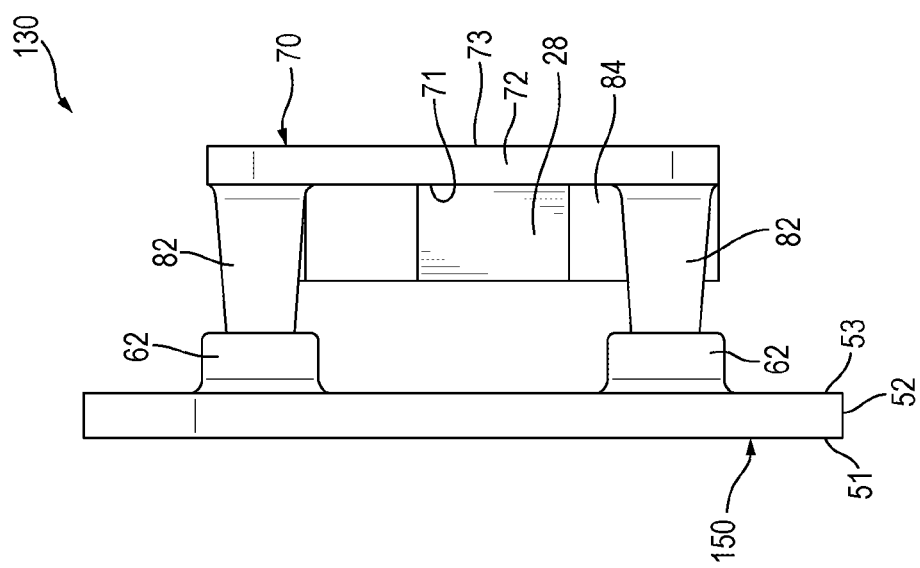
FIG. 11 is a side view of an impaction assembly according to another embodiment.
Figure 12A:
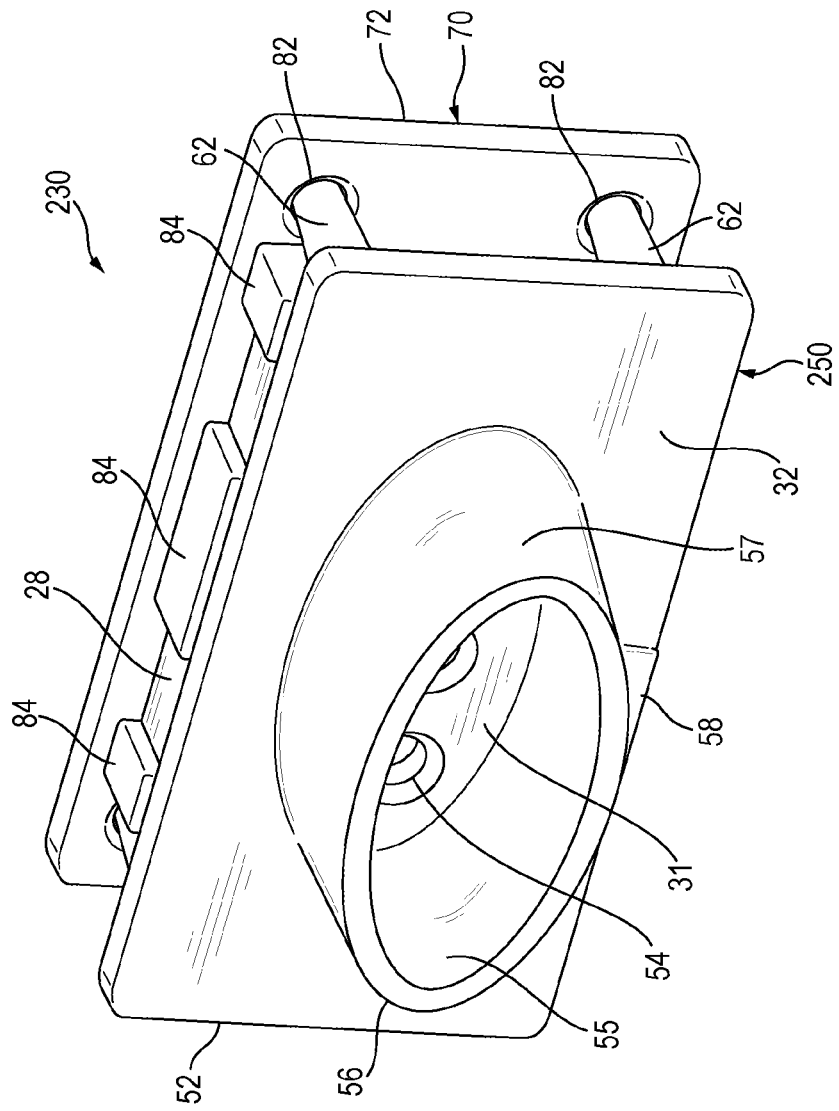
FIG. 12A is a perspective view of an impaction assembly according to yet another embodiment.
Figure 13A:
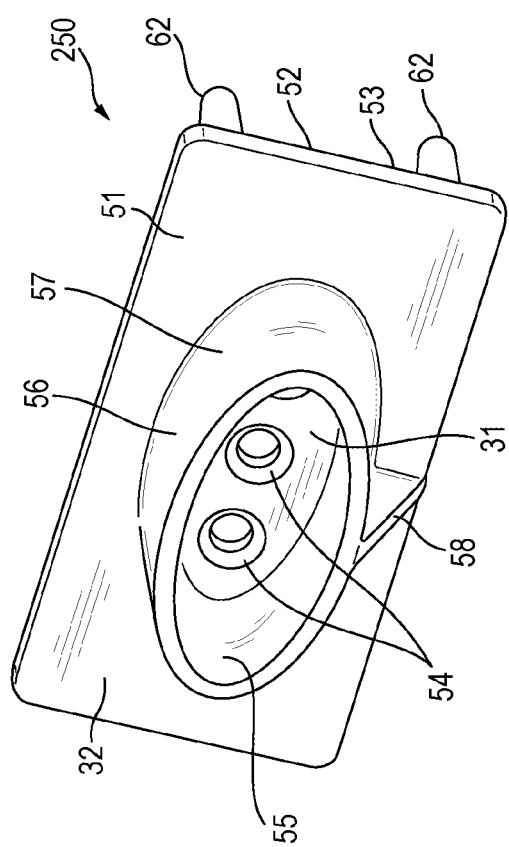
FIG. 13A is a perspective view of the nozzle plate of the impaction assembly of FIG. 12A.
Figure 13B:
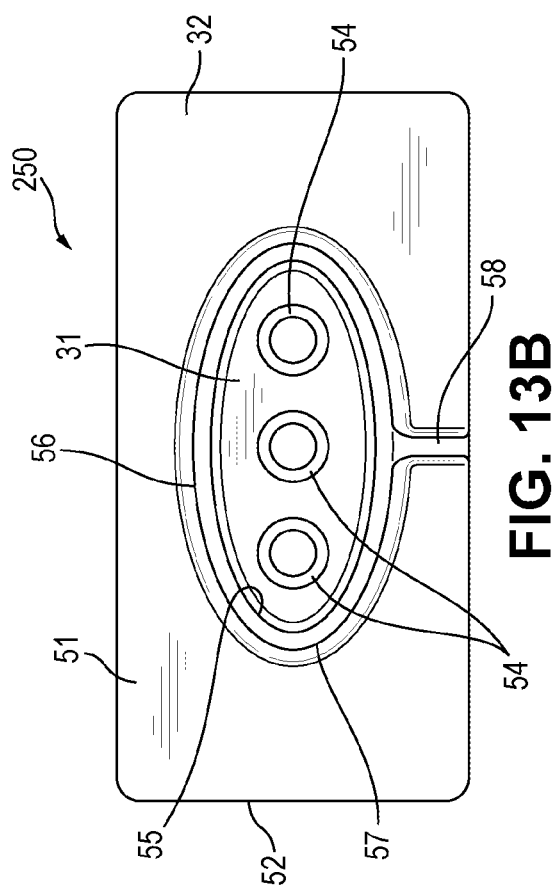
FIG. 13B is a front view of the nozzle plate of FIG. 13A.
Figure 14:
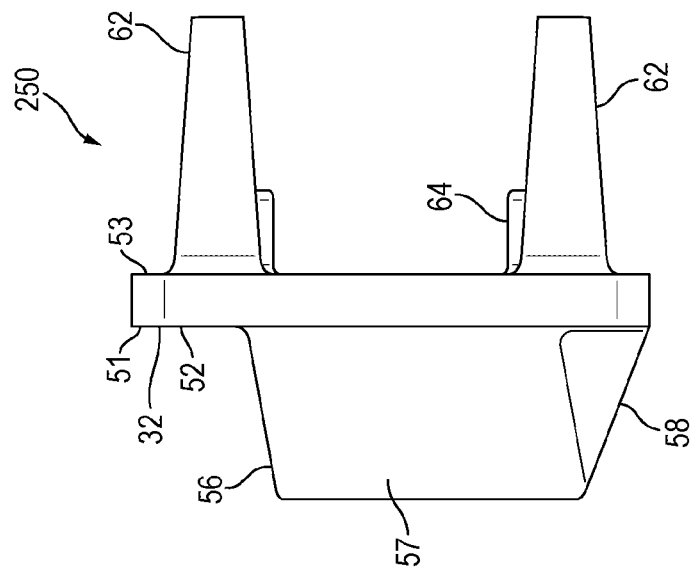
FIG. 14 is a side view of a nozzle plate according to another embodiment.
Figure 13C:
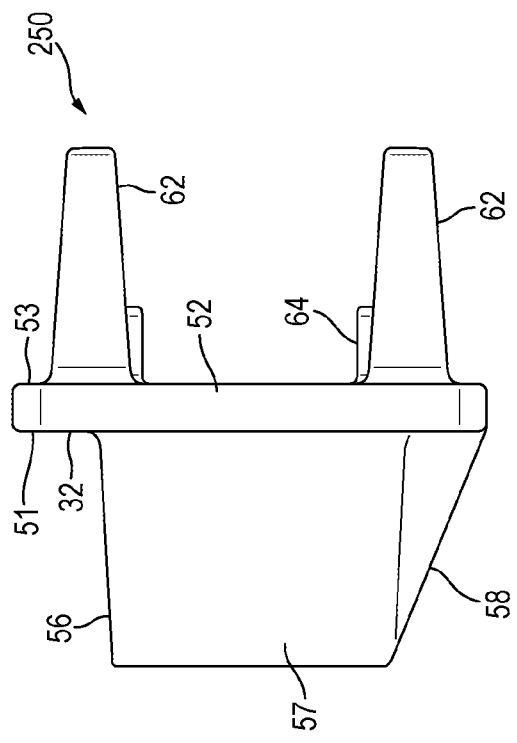
FIG. 13C is a side view of the nozzle plate of FIG. 13A in a horizontal orientation.
Figure 13D:
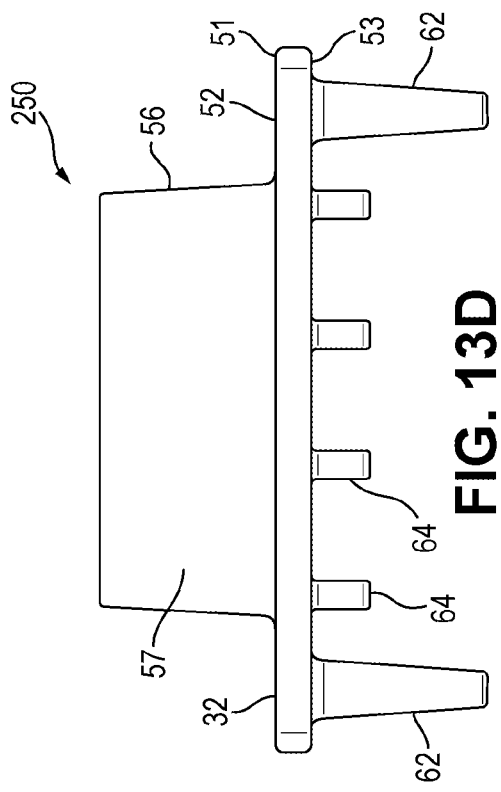
FIG. 13D is a top view of the nozzle plate of FIG. 13A in a vertical orientation.
Figure 16A:
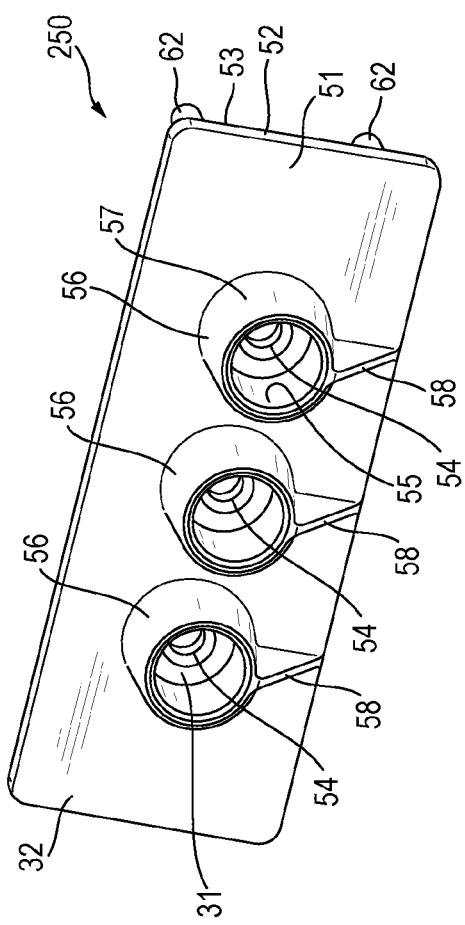
FIG. 16A is a perspective view of the nozzle plate of the impaction assembly of FIG. 15A.
Figure 16B:
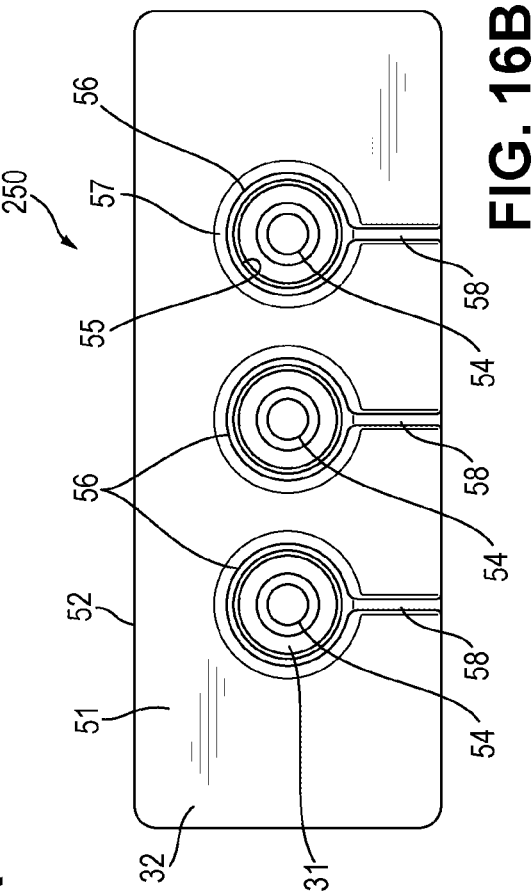
FIG. 16B is a front view of the nozzle plate of FIG. 16A.

According to another embodiment as shown in FIG. 11, the nozzle plate interlocking feature 62 comprises a circular hole, and the media holder interlocking feature 82 comprises a circular post. However, it is understood that the nozzle plate interlocking feature 62 and the media holder interlocking feature 82 may be any combination of different complementary interlocking features, including but not limited to protrusions, extensions, divots, through-holes, recesses, slots, and snaps.

In order to secure the filter media 28 between the nozzle plate 150 and the media holder 70, the nozzle plate 150 comprises at least one media spacer 64 along the downstream side 53 of the wall 52 of the nozzle plate 150, and the media holder 70 comprises at least one media support 84 along the upstream side 71 of the wall 72 of the media holder 70, both of which support and secure the filter media 28 between the nozzle plate 150 and the media holder 70. Neither the media spacers 64 nor the media supports 84 (or any other portion of the impaction assembly 130, in particular the nozzle plate 150 or the media holder 70) penetrate, protrude, or extend into any portion of the filter media 28. Accordingly, the tolerance of the nozzle plate 150 and the media holder 70 are tight in order to ensure that none of the components protrudes into the filter media 28 while still holding the filter media 28 securely. Furthermore, neither the media spacer 64 nor the media supports 84 (or any other portion of the impaction assembly 130, in particular the nozzle plate 150 and the media holder 70) cause elastic or plastic deformation of the filter media 28. Due to this configuration and according to one embodiment, the filter media 28 is not welded to any portion of the separation assembly 20, such as the housing 22 or the impaction assembly 130.

The media spacer 64 protrudes or extends downstream from the downstream side 53 of the wall 52 in order to space the filter media 28 out from the nozzle plate 150. The media spacer 64 presses against the upstream side of the filter media 28 in order to press the filter media 28 toward the media holder 70. Accordingly, the media spacer 64 may be a post or protrusion extending from the downstream side 53 of the wall 52. The nozzle plate 150 may include multiple media spacers 64 along the downstream side 53 of the wall 52 in order to evenly press the filter media 28 toward the media holder 70. The media spacers 64 are shorter than the posts (that are one of the interlocking features 62 or 82) in order to allow for sufficient room for the filter media 28 between the nozzle plate 150 and the media holder 70 (in particular between the downstream end of the media spacers 64 and the upstream end the media holder 70). The media spacers 64 are configured to directly abut the outside (only) of the upstream side of the filter media 28. As shown in FIG. 9, the media spacers 64 are positioned further from the outer edges of the nozzle plate 150 than the nozzle plate interlocking feature 62 since the media spacers 64 are configured to abut a front or back surface of the filter media 28, whereas the nozzle plate interlocking features 62 are configured to be positioned outside of the outer perimeter of the filter media 28. Accordingly, the media spacers 64 are surrounded or encompassed by the nozzle plate interlocking features 62 and are positioned within the area defined by the nozzle plate interlocking features 62.

The media support 84 protrudes or extends upstream from the upstream side 71 of the wall 72 in order to hold the filter media 28 in place. The filter media 28 extends along and may optionally lie flush against the upstream side 71 of the wall 72. Accordingly, the media support 84 may be a rib, post, extension, or protrusion that extends from the upstream side 71 of the wall 72 and is configured to extend along at least a portion of the side surfaces of the outer perimeter of the filter media 28 (i.e., the surfaces between the upstream side and the downstream side of the filter media 28 and that define the outer perimeter of the filter media 28). The media supports 84 are shorter than the posts (that are one of the interlocking features 62 or 82) and may be approximately the same height as the filter media 28 (i.e., the distance between the upstream side and the downstream side of the filter media 28).

The media supports 84 may be positioned and extend along the outside (only) of each side surface and the corners (along the outside perimeter) of the filter media 28 in order to hold the filter media 28 in place along the media holder 70. The filter media 28 is not fastened (e.g., adhered, glued, or welded) to the media holder 70, although the media supports 84 are able to securely hold the filter media 28 in place along the media holder 70 (and the media spacer 64, along with the attachment of the media holder 70 and the nozzle plate 150 through the interlocking features 62, 82, further secure the filter media 28 in between the media holder 70 and the nozzle plate 150). Since the filter media 28 is positioned within an area defined by the media holder interlocking features 82, the media supports 84 are also positioned at least partially within the area defined by the media holder interlocking features 82 (i.e., closer to the center of the media holder 70), as shown in FIGS. 10A-10B.

Impaction Assembly with Chimney

FIGS. 12A-18 show an impaction assembly 230 that includes all of the various features, benefits, and components of the impaction assembly 130, except where noted otherwise. Like reference numbers are used where applicable. For example, the impaction assembly 230 comprises a nozzle plate 250, the filter media 28, and the media holder 70 and is configured to hold and secure the filter media 28 between the nozzle plate 250 and the media holder 70. The separation assembly 20 may further comprise the impaction assembly 230.

The configuration and components of the impaction assembly 230 (e.g., the combination of the chimney 56 and the various components to secure the filter media 28 and attach the nozzle plate 250 and the media holder 70 together) reduces the overall cost, simplifies assembly (compared to conventional impaction assemblies), and is particularly valuable in automotive applications.

The nozzle plate 250 is similar to and includes the various features, benefits, and components of both the nozzle plate 50 and the nozzle plate 150 except where noted otherwise. Like reference numbers are used where applicable. For example, the nozzle plate 250 includes the chimney 56 and the gusset 58 in order to direct fluid flow (as described further herein, in particular in reference to FIGS. 4-7C), as well as the nozzle plate interlocking feature 62 and the media spacer 64 (as described further herein, in particular in reference to FIGS. 8A-11) in order to attach to the media holder 70 and secure the filter media 28.

Furthermore, the nozzle plate 250 includes the wall 52 and at least one impactor nozzle 54, as described further herein. The upstream side 51 of the wall 52 of the nozzle plate 250 may include all of the various features, benefits, and components of the nozzle plate 50, as shown and described further herein (in particular in reference to FIGS. 5A-7C). The downstream side 53 of the wall 52 of the nozzle plate 250 may include all of the various features, benefits, and components of the nozzle plate 150, as shown and described further herein (in particular in reference to FIG. 9).

FIGS. 12A-14 show an embodiment of the impaction assembly 230 that includes a plurality of nozzles 54 and only a single chimney 56 (that surrounds multiple nozzles 54) along the nozzle plate 250, as described further herein (in particular in reference to FIGS. 5A-6). As shown in FIGS. 12B-12C and 13C-14, the impaction assembly 230 can be oriented in a variety of different directions or orientations (e.g., horizontal, vertical, angled, or inclined), as described further herein (in particular in reference to FIGS. 5C-6 and 8B-8C).

FIGS. 15A-17 show an embodiment of the impaction assembly that includes multiple chimneys 56 (that each surround only one, single nozzle 54) along the nozzle plate 250, as described further herein (in particular in reference to FIGS. 7A-7C). As shown in FIGS. 15B-15C and 16C-17) the impaction assembly 230 can be oriented in a variety of different directions or orientations (e.g., horizontal, vertical, angled, or inclined), as described further herein (in particular in reference to FIGS. 5C-6 and 8B-8C).

The configuration of the media holder 70 and the attachment between the nozzle plate 250 and the media holder 70 (in reference to the nozzle plate 150) are described further herein. For example, to attach to the nozzle plate 250 and the media holder 70 together, the nozzle plate 250 comprises at least one nozzle plate interlocking feature 62 along at least the downstream side 53 of the wall 52, and the media holder 70 comprises at least one media holder interlocking feature 82 along at least the upstream side 71 of the wall 72, each of which are described further herein.

Figure 18:
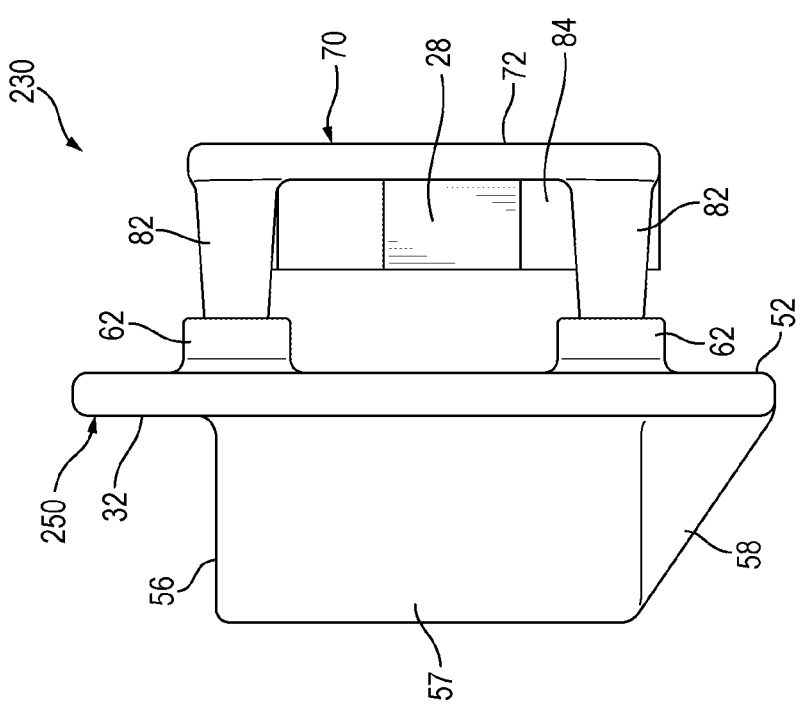
FIG. 18 is a side view of an impaction assembly according to yet another embodiment.

According to one embodiment as shown in FIGS. 12A-17, the nozzle plate interlocking feature 62 comprises a circular post, and the media holder interlocking feature 82 comprises a circular hole with a certain depth that is configured to receive and secure an end of the circular post. According to another embodiment as shown in FIG. 18, the nozzle plate interlocking feature 62 of the impaction assembly 230 is a circular hole, and the media holder interlocking feature 82 of the impaction assembly 230 is a circular post (as described further herein, in particular in reference to FIG. 11). However, it is understood that the nozzle plate interlocking feature 62 and the media holder interlocking feature 82 may be any combination of different complementary interlocking features, including but not limited to protrusions, extensions, divots, through-holes, recesses, slots, and snaps.

In order to secure the filter media 28 between the nozzle plate 250 and the media holder 70, the nozzle plate 250 comprises at least one media spacer 64 along the downstream side 53 of the wall 52 of the nozzle plate 250, and the media holder 70 comprises at least one media support 84 along the upstream side 71 of the wall 72 of the media holder 70, as described further herein.

Pre-Separator

As shown in FIGS. 21-28, the separation assembly 20 may further comprise a pre-separation assembly or pre-separator 440 in order to enhance air-liquid separation. The pre-separator 440 separates out coarser oil particles from the incoming blow-by gases near the inlet 24. Due to the configuration of the pre-separator 440, the pre-separator 440 is compact, designed to fit in a limited space, and takes up minimal extra space within the separation assembly 20, thereby adhering to stringent packaging constraints (particularly in passenger car crankcase ventilation systems). Furthermore, the pre-separator 440 only causes a marginal pressure drop in the fluid across the pre-separator 440, effectively drains out the separated oil, and prevents oil splashed from rotating parts (inside the crankcase, for example) from flowing through the separation assembly 20.

Figure 21:
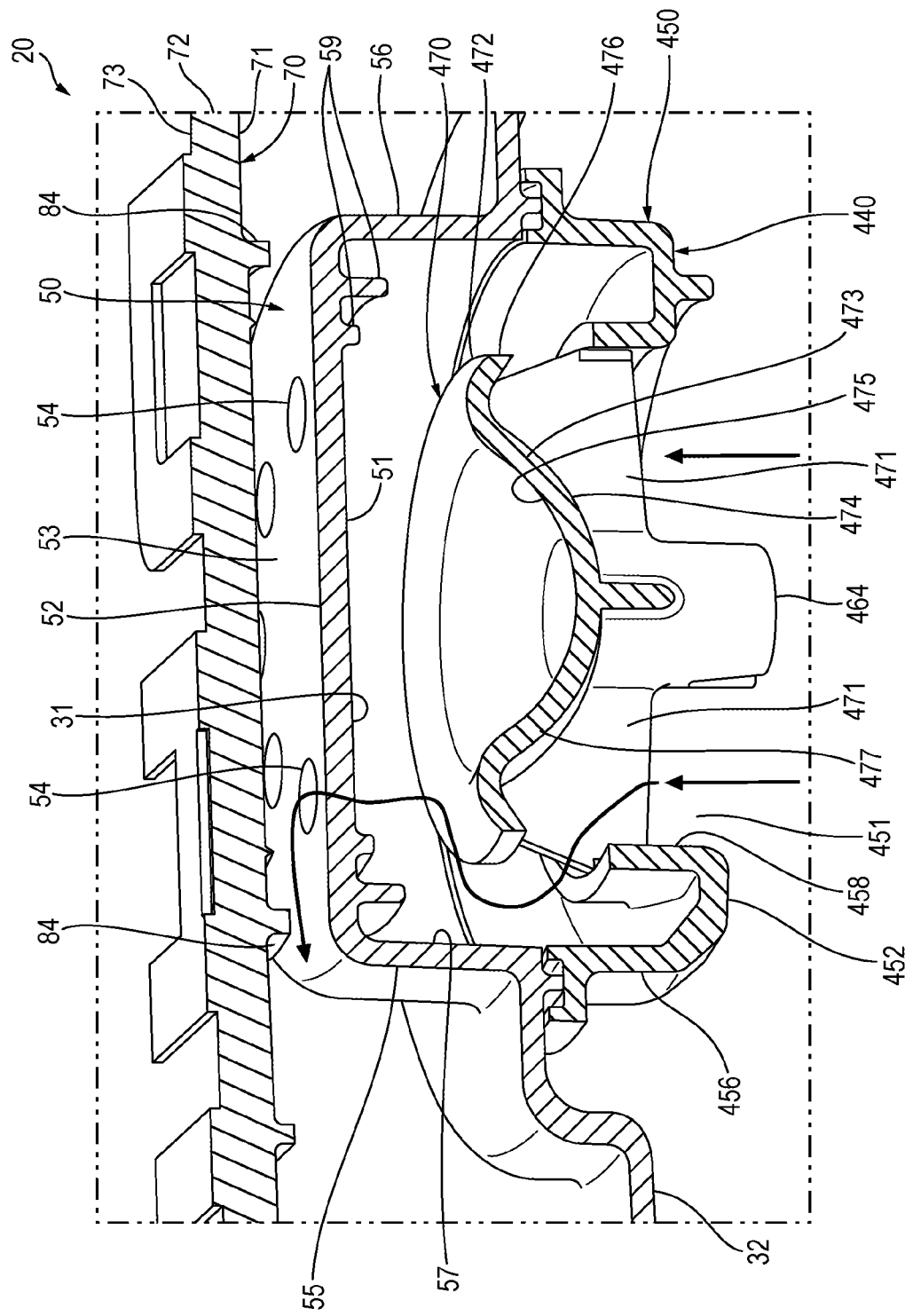
FIG. 21 is a cross-sectional, perspective view of a separation assembly according to another embodiment.

As shown in FIG. 21, the pre-separator 440 is designed for use with the nozzle plate 50, in particular with the chimney 56 (as described further herein). Although the chimney 56 is shown as having a substantially round or circular cross-sectional shape, it is understood that the chimney 56 may be a variety of different shapes such as a rectangular, square, triangular, polygonal, or irregular cross-sectional shape (and that the pre-separator 440 is shaped accordingly and complementary to the shape of the chimney 56). However, as described further herein, the pre-separator 440 may be used with or independently from an impactor (for example, used with a nozzle plate with nozzles or used without a nozzle plate with nozzles and instead with a plate with at least one aperture(s)). It is understood that the pre-separator 440 may be alternatively be used with the nozzle plate 250 within the impaction assembly 230 (as described further herein).

Figure 28:
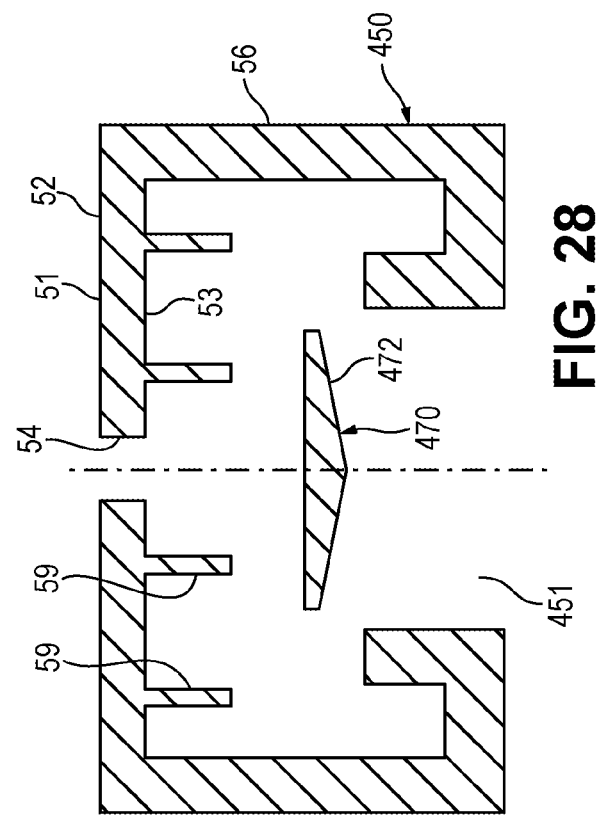
FIG. 28 is a cross-sectional view of a separation assembly according to yet another embodiment.
Figure 27:
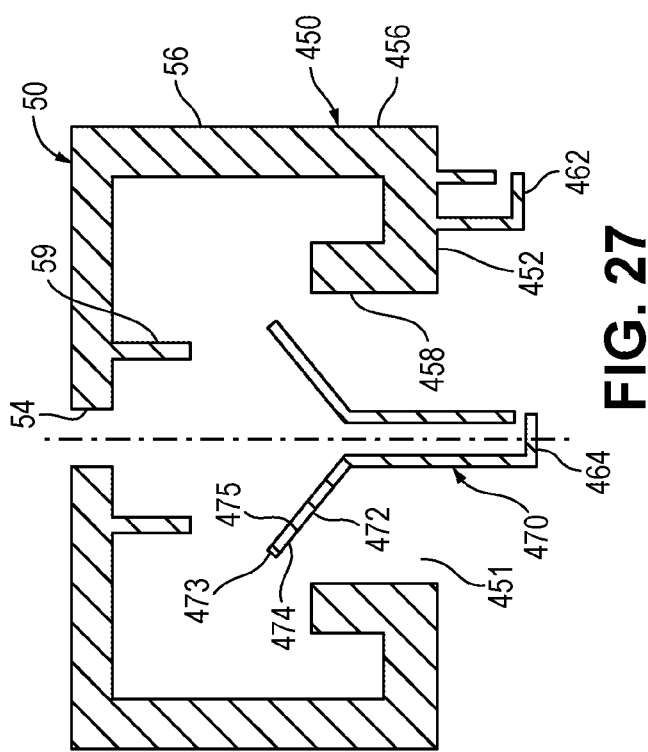
FIG. 27 is a cross-sectional view of a separation assembly according to still another embodiment.

As shown in FIG. 21, the wall 52 (that the chimney 56 extends upstream from) may comprise at least one rib 59. The rib 59 extends circumferentially completely around the nozzle(s) 54 and extends upstream from the upstream side 51 of the wall 52, parallel (or substantially parallel) to the chimney 56. The rib 59 may have the same cross-sectional shape as the chimney 56, such as a circular cross-sectional shape. However, the rib 59 is substantially shorter than the chimney 56 (i.e., the chimney 56 extends further upstream than the rib 59 from the upstream side 51 of the wall 52) such that fluid can flow between the deflector 472 and the upstream end of the rib 59. The rib 59 is radially spaced apart from nozzle 54 such that a portion of the wall 52 is positioned radially between the inner surface of the rib 59 and the nozzle 54. The wall 52 may include any number of ribs 59, such as one rib 59 (as shown in FIG. 27) or two ribs (as shown in FIG. 28). The inner rib 59 is radially surrounded by the outer rib 59 (which is radially surrounded by the chimney 56). The ribs 59 may be the same height or different heights. For example, the innermost rib 59 may be shorter than the outermost rib 59. As shown in FIGS. 21, 27, and 28, the ribs 59 can be positioned at a variety of different distances from the nozzle 54.

Figure 25:
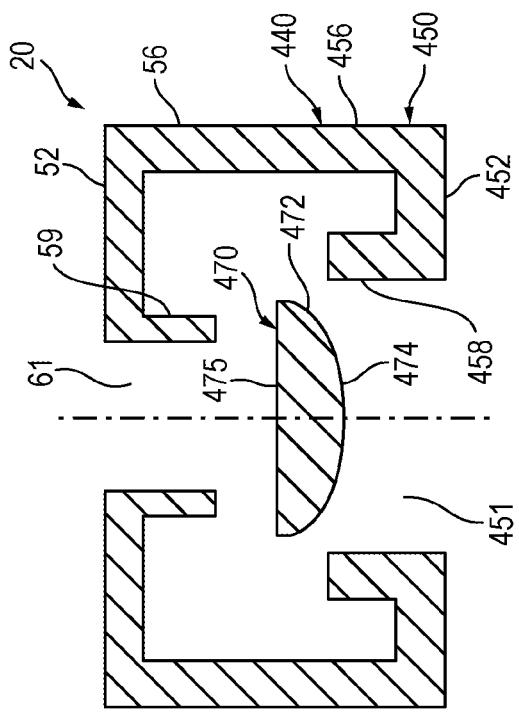
FIG. 25 is a cross-sectional view of a separation assembly according to another embodiment.
Figure 24:
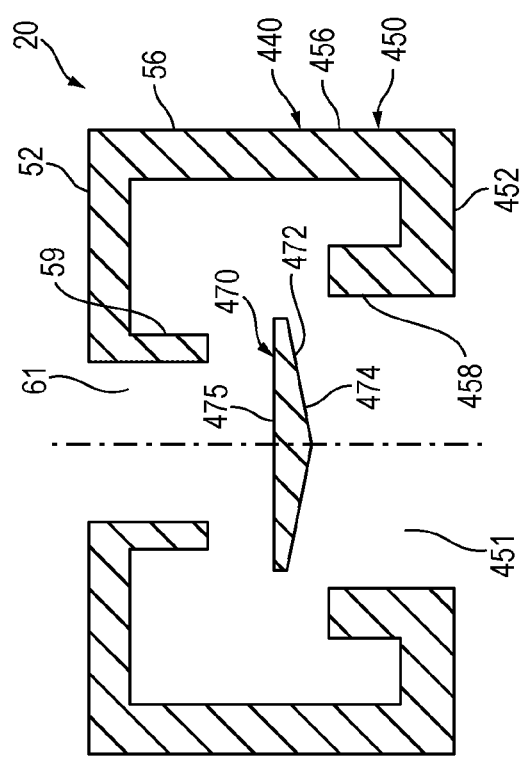
FIG. 24 is a cross-sectional view of a separation assembly according to still another embodiment.

According to another embodiment as shown in FIGS. 24-25, the pre-separator 440 may be used independently without an impactor and can be used in any location within the separation assembly 20 (e.g., anywhere within the crankcase ventilation system). Accordingly, instead of defining nozzles 54 on the wall 52, the wall 52 simply has a rib 59 whose inner surface defines a through-hole or an aperture 61, and the wall 52 does not extend beyond the rib 59 to create any nozzle. The aperture 61 may include all of the features and characteristics of the nozzle 54, unless otherwise specified.

The pre-separator 440 is attachable to or integrated with the chimney 56, depending on the desired configuration. For example, as shown in FIG. 21, the pre-separator 440 may be separately formed from the chimney 56 and later attached to the chimney 56 (through the outer wall 456 of the outer portion 450 of the pre-separator 440 and the upstream end of the chimney 56, for example). Alternatively, as shown in FIGS. 24-25 and 27-28, the pre-separator 440 (or a portion of the pre-separator 440, such as the outer portion 450) may be integrally formed, constructed, or molded with the chimney 56 as a single-piece. Accordingly, the pre-separator 440 and the chimney 56 comprise a single unitary component that cannot be separated without destruction.

As shown in FIG. 21, the pre-separator 440 comprises an outer portion 450 and an inner portion 470. The outer portion 450 defines an aperture 451 (that extends completely through the outer portion 450), and the inner portion 470 is positioned directly upstream from the aperture 451 (and optionally at least partially within the aperture 451).

As shown in FIG. 21, the outer portion 450 of the pre-separator 440 extends directly upstream from the upstream end of the chimney 56, has substantially the same cross-sectional shape as the chimney 56, and therefore also surrounds the nozzle 54. The outer portion 450 comprises an upstream wall 452, an outer wall 456, and an inner wall 458. The upstream wall 452 extends between the upstream ends of the outer wall 456 and the inner wall 458 and is substantially perpendicular to the outer wall 456 and the inner wall 458. The outer wall 456 and the inner wall 458 are radially spaced apart from each other by the upstream wall 452 (the inner wall 458 is positioned inwardly from the outer wall 456). The outer wall 456 and the inner wall 458 are approximately parallel to the longitudinal axis of the aperture 451, and the height of the inner wall 458 may optionally be less than the height of the outer wall 456. Due to the configuration of the outer portion 450, as well as the rest of the pre-separator 440, separated oil is collected along the downstream surface of the upstream wall 452, in an area between the inner surface of the outer wall 456 and the outer surface of the inner wall 458. As shown and described further herein, the outer portion 450 may include an outer drain 462 along this area between the inner surface of the outer wall 456 and the outer surface of the inner wall 458 to drain the separated, collected oil.

As shown in FIG. 21, the outer portion 450 is attachable to the nozzle plate 50 (in particular to the chimney 56) through the outer wall 456. In particular, the outer wall 456 may include an outer extension that extends radially outward from the outer surface of the outer wall 456 and is configured to attach to a portion of the nozzle plate 50, such as an upstream end of the chimney 56. Accordingly, the pre-separator 440 is attached to the upstream end of the chimney 56 and the wall 52 and the nozzles 54 (if included) are positioned along the downstream end of the chimney 56.

As shown in FIG. 21, the inner portion 470 of the pre-separator 440 comprises a deflector 472, at least one connector 471, and optionally an inner drain 464 to drain the collected oil. As described further herein, the baffle or deflector 472 is configured to accelerate the fluid flow (with the inner wall 458 of the outer portion 450) and then change the direction of the fluid flow in order to cause oil separation from the fluid. The deflector 472 is positioned directly upstream of the nozzle 54 and is spaced apart from the nozzle 54 (in the direction of fluid flow) by a distance in order to allow fluid to flow upstream of the deflector 472 and into the nozzle 54. The deflector 472 is centered with the longitudinal axis of the aperture 451 (and is positioned directly upstream of and optionally at least partially within the aperture 451). The deflector 472 is positioned at least partially within at least one of the chimney 56 and the outer portion 450 (and optionally completely within the chimney 56).

The deflector 472 comprises a wall 473 with an upstream surface 474 (upon which the fluid (that has flowed through the aperture 451 impinges) and a downstream surface 475 that are opposite each other. In order to accelerate the fluid flowing into the pre-separator 440, the wall 473 (in particular the upstream surface 474) has an angled or curved shape, where the center or innermost radial portion of the deflector 472 (along the upstream surface 474 of the deflector 472) is positioned further upstream than the outermost radial portion or the outer edge 476. Accordingly, the upstream surface 474 comprises a convex shape. The upstream surface 474 may be curved or extend straight between the innermost radial portion and the outermost radial portion. The downstream surface 475 has a complementary concave shape to the upstream surface 474 that is able to capture separated oil (upstream of the deflector 472) and facilitates the draining of the separated oil through the inner drain 464 (as described further herein). The overall angle of the upstream surface 474 and the downstream surface 475 (i.e., the angle between the center and the outer edge 476) may be varied according to the desired configuration.

The outer edge 476 of the deflector 472 extends and is positioned radially outward beyond the nozzle(s) 54 in order to cause the fluid to change direction as the fluid flows radially outwardly from a center area along the upstream surface 474, around the outer edge 476 of the deflector 472, and radially inwardly along the downstream surface 475 to the nozzle(s) 54 (as described further herein). Accordingly, the outer width (or outer diameter) of the deflector 472 (i.e., the distance between opposite outer edges 476, along the widest portion of the deflector 472) is larger than the distance between the outermost edges of two opposite nozzles 54 (if there are multiple nozzles 54) or larger than the diameter of the nozzle 54 (if there is only one nozzle 54). The outer width of the deflector 472 may be greater than, equal to, or less than the inner diameter of the aperture 451. The outer edge 476 of the deflector 472 is positioned downstream from the downstream end of the inner wall 458 and upstream from the upstream end of the ribs 59 (and therefore in between the inner wall 458 and the ribs 59 along the direction of flow), as described further herein.

As shown in FIGS. 21 and 26B, the connector 471 connects the deflector 472 to the outer portion 450. For example, the connector 471 may extend from and connect the upstream surface 474 of the deflector 472 (as well as the outer surface of the inner drain 464) to the inner surface of the inner wall 458 of the outer portion 450. The inner portion 470 may include multiple connectors 471 positioned along various portions of the outer perimeter of the deflector 472 (and optionally the inner drain 464) with spaces therebetween for fluid flow in order to provide multiple points of connection between the outer portion 450 and the deflector 472 (and the inner drain 464) for greater stability.

Figure 22:
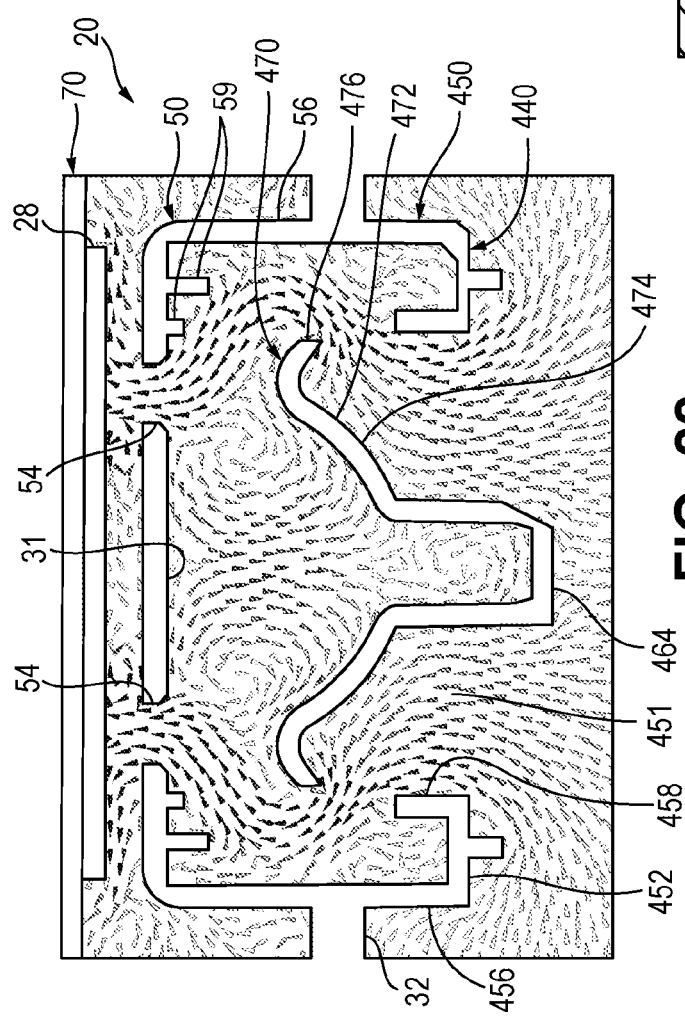
FIG. 22 is a vector plot of fluid flowing through the separation assembly of FIG. 21.

As shown in FIG. 21 in view of FIG. 22, fluid enters into the pre-separator 440 through the aperture 451 and flows substantially axially through the aperture 451. Due to the positioning and shape of the deflector 472, the fluid subsequently hits the upstream surface 474 of the deflector 472 (which separates out some of the oil in the fluid onto the upstream surface 474) and flows substantially radially outwardly along the upstream surface 474 (i.e., toward the outer wall 456), through a relatively narrowed area between the outer portion 450 and the deflector 472 (in particular between the downstream end of the inner wall 458 of the outer portion 450 and the outer edge 476 and the upstream surface 474 of the deflector 472). In particular, the convex shape of the upstream surface 474 of the deflector 472 continually narrows the available area for the fluid to flow through (as the fluid flows radially outward toward the narrowed area). Accordingly, the narrowed area between the deflector 472 and the inner wall 458 is smaller than the cross-sectional area of the aperture 451, which causes the fluid flow to accelerate within the pre-separator 440 (in particular at the outer edge 476) and thus increase the momentum of the incoming oil droplets.

Because the nozzles 54 are positioned radially inward from the outer edges 476 of the deflector 472, the fluid subsequently changes direction suddenly (after it is accelerated at the narrowed area) as it flows around the outer edges 476 of the deflector 472. In particular, the fluid flows radially outward (due to the upstream surface 474 of the deflector 472), axially beyond the outer edge 476 of the deflector 472, and then radially inward toward the nozzle(s) 54 along the downstream surface 475 of the deflector 472 (and the upstream side 51 of the wall 52). The respective inner surfaces of the outer wall 456 and the chimney 56 also help the fluid change direction as it flows around the deflector 472. By changing the flow direction of the fluid, the coarser oil particles are separated out (by inertial separation).

Pre-Separator Relative Dimensions

Figure 23:
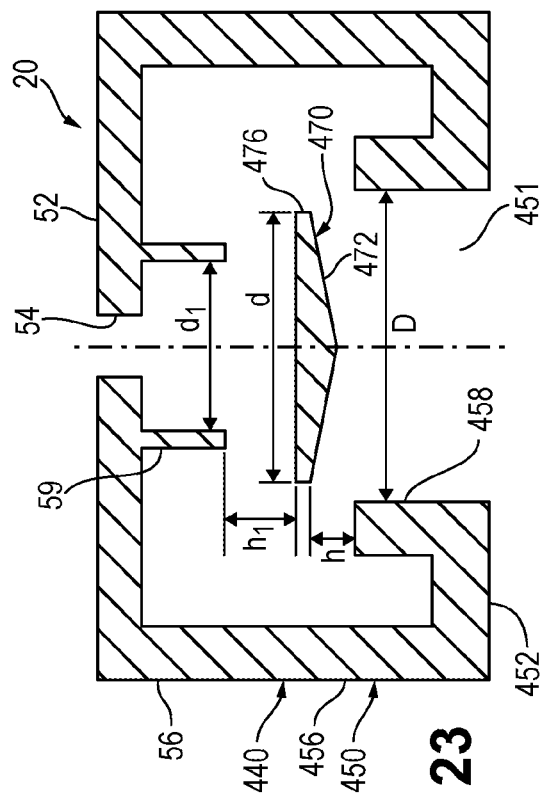
FIG. 23 is a cross-sectional view of a separation assembly according to yet another embodiment.

The pre-separator 440 may have a variety of different relative dimensions in order to provide effective oil separation in a compact space, as shown in FIG. 23. For example, ratio X, which is the ratio of the deflector outer width or diameter d of the deflector 472 to the rib inner diameter di of the rib 59, indicates the amount that the deflector 472 overlaps the area within the rib 59 and can range from approximately 0.5 to 1.5. If the ratio X is less than 1, then the amount of overlap is negative (i.e., the deflector 472 does not extend along the entire area within the rib 59). If there are multiple ribs 59, di corresponds to the inner diameter of the rib 59 with the smallest inner diameter (i.e., the innermost rib 59). Ratio Y, which is the deflector outer diameter d to the entry inner diameter D of the aperture 451, indicates the area ratio of the deflector 472 to the aperture 451 and can range from approximately 0.5 to 1.5. Ratios above or below this range may have unrealistic design features or may require a very large area and therefore would no longer provide a compact pre-separator. The height h (i.e., the distance between the downstream end of the inner wall 458 and the upstream end of the outer edge 476 of the deflector 472) and the height hi (i.e., the distance between the downstream end of the outer edge 476 of the deflector 472 and the upstream end of the rib 59) can be varied in order to achieve a desired fluid velocity across the pre-separator 440.

Deflector Shape

The deflector 472 may have a variety of different shapes in order to accelerate the fluid flow, depending on the desired configuration. For example, the deflector 472 may have angled surfaces or walls that are curved or straight in order to create the convex shape of the upstream surface 474 of the deflector 472. For example, at least the upstream surface 474 of the deflector 472 may have a dome shape with curved surfaces or walls (as shown in FIG. 21), a conical shape with surfaces or straight walls (as shown in FIG. 24), or a rounded or semi-spherical shape with curved surfaces or walls (as shown in FIG. 25). The downstream surface 475 of the deflector 472 may have the same complementary shape as the upstream surface 474 (except the downstream surface 475 is concave and the upstream surface 474 is convex) or may be substantially flat.

As shown in FIG. 21, the wall 473 of the deflector 472 comprises a base 477 and a hook 478. The base 477 is positioned radially inward from the hook 478 (along the center portion of the deflector 472) and extends downstream as it extends radially outward from the center (due to the convex shape of the upstream surface 474). The hook 478 is positioned radially outward from the base 477, along the outer edge 476 of the wall 473 (and extends about the entire outer perimeter of the base 477). The hook 478 extends in an opposite direction from the base 477 by instead extending upstream as it extends radially outward from the base 477, unlike the base 477. The hook 478 prevents the separated oil from being re-entrained with the rest of the fluid flow.

According to one embodiment, and as shown in FIGS. 26A-26B, the deflector 472 comprises at least one curved vane 482 along (and extending upstream from) the upstream surface 474 of the wall 473 in order to affect the direction of fluid flow as it enters into the pre-separator 440 and flows radially outward along the upstream surface 474. For example, the deflector 472 may include a plurality of vanes 482 (such as six vanes 482) spaced apart from each other along the upstream surface 474. The vanes 482 extend radially outward from a central portion of the deflector 472 (such as along the outer surface of the inner drain 464) to the outer edge 476 of the deflector 472 along the upstream surface 474. As the vanes 482 extend radially outward, the vanes 482 curve tangentially along the upstream surface 474 to cause the fluid flowing into the pre-separator 440 to swirl tangentially, which increases the amount of oil separation.

Drains

The pre-separator 440 comprises at least one drain that drains out separated fluid (e.g., oil) from the fluid flow from an upstream side of the pre-separator 440. In particular, as shown in FIGS. 26B-27, the outer portion 450 of the pre-separator 440 comprises the outer drain 462, and the inner portion 470 of the pre-separator 440 comprises the inner drain 464. The outer drain 462 and the inner drain 464 each have corresponding drain tubes or collection zones for oil to be collected within and drained out from and thus both allow the separated oil to be effectively drained from the pre-separator 440. The outer drain 462 and the inner drain 464 are also provided at locations where the flow interaction of the fluid is minimum. For example, the outer drain 462 extends upstream from the upstream side of the upstream wall 452 of the outer portion 450. The inner drain 464 extends upstream from the upstream surface 474 of the wall 473 of the deflector 472 and may extend further upstream than the upstream side of the upstream wall 452 of the outer portion 450. The outer drain 462 and/or the inner drain 464 may be used with a non-return valve in order to prevent separated oil from entering back into the pre-separator 440.

Due to the concave shape of the downstream surface 475 of the deflector 472, separated oil that is separated out downstream of the deflector 472 may be captured into the deflector 472 along the downstream surface 475. The center of the deflector 472 includes an aperture that fluidly connects and opens into downstream surface 475 and the inner drain 464 such that separated oil can flow (in an upstream direction) directly from the downstream surface 475 of the deflector 472 into an inner area of the inner drain 464, and out from the pre-separator 440 through the inner drain 464.

As utilized herein, the term "approximately" and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A separation assembly comprising:
   a filter media;
   a housing comprising an inlet and an outlet; and
   a plate positioned within the housing between the inlet and the outlet and directing fluid onto the filter media,
   the plate comprising a wall, a plurality of apertures, and a chimney comprising an inner surface surrounding the plurality of apertures and an outer surface, an upstream side of the wall comprising an inner portion that is radially encompassed by the chimney and an outer portion, the inner portion and the outer portion upstream of the plurality of apertures,
   the chimney extending from the upstream side of the wall and encompassing only a portion of a flow path between the inlet and the upstream side of the wall such that fluid flows radially beyond the outer surface of the chimney in the housing between the inlet and the wall.

2. The separation assembly of claim 1, wherein the plate is a nozzle plate and the each of the plurality of apertures is part of a respective nozzle.

3. The separation assembly of claim 2, further comprising an impaction assembly that comprises the nozzle plate, a media holder operatively attached to the nozzle plate, and the filter media positioned between the nozzle plate and the media holder.

4. The separation assembly of claim 3, wherein the nozzle plate comprises at least one media spacer, and the media holder comprises at least one media support such that the filter media is secured between the nozzle plate and the media holder.

5. The separation assembly of claim 4, wherein the at last one media spacer extends from a downstream side of the wall of the nozzle plate and presses against an upstream side of the filter media so as to press the filter media toward the media holder.

6. The separation assembly of claim 3, wherein the nozzle plate comprises at least one media spacer that spaces the filter media out from the nozzle plate.

7. The separation assembly of claim 3, wherein the media holder comprises at least one media support such that the filter media is secured between the nozzle plate and the media holder.

8. The separation assembly of claim 7, wherein the at least one media support extends from an upstream side of a wall of the media holder and extends along at least a portion of the outer perimeter of the filter media, and wherein the filter media extends along the upstream side of the wall of the media holder.

9. The separation assembly of claim 3, wherein neither the nozzle plate nor the media holder penetrates into the filter media.

10. The separation assembly of claim 3, wherein the filter media is not adhered to the media holder.

11. The separation assembly of claim 3, wherein the nozzle plate comprises at least one nozzle plate interlocking feature and the media holder comprises at least one media holder interlocking feature, wherein the at least one nozzle plate interlocking feature and the at least one media holder interlocking feature are interlockable with each other in order to attach the nozzle plate and the media holder together.

12. The separation assembly of claim 11, wherein the media holder comprises a plurality of media holder interlocking features, and wherein the filter media is configured to fit within an area defined by the plurality of media holder interlocking features.

13. The separation assembly of claim 3, wherein the nozzle plate comprises a gusset that extends from an outer surface of the at least one chimney and the upstream side of the wall.

14. The separation assembly of claim 3, further comprising a plurality of nozzles, wherein the chimney surrounds multiple nozzles of the plurality of nozzles.

15. The separation assembly of claim 1, further comprising a pre-separator comprising a deflector positioned directly upstream of the plurality of apertures and an outer portion extending directly upstream from the chimney and surrounding the plurality of apertures.

16. The separation assembly of claim 15, wherein an upstream surface of the deflector comprises a convex shape such that a center portion of the deflector along the upstream surface of the deflector is further upstream than an outer edge of the deflector.

17. The separation assembly of claim 15, wherein the deflector is positioned at least partially within at least one of the chimney and the outer portion.

18. The separation assembly of claim 15, wherein the pre-separator further comprises at least one drain that drains out separated fluid from an upstream side of the pre-separator.

* * * * *